US009866790B2

(12) United States Patent
Mikami et al.

(10) Patent No.: US 9,866,790 B2
(45) Date of Patent: Jan. 9, 2018

(54) INFORMATION PROCESSING SYSTEM, INFORMATION PROCESSING APPARATUS, AND INFORMATION PROCESSING METHOD

(71) Applicants: Junpei Mikami, Kanagawa (JP); Takuya Imai, Tokyo (JP); Kenichiro Morita, Tokyo (JP); Shoh Nagamine, Kanagawa (JP)

(72) Inventors: Junpei Mikami, Kanagawa (JP); Takuya Imai, Tokyo (JP); Kenichiro Morita, Tokyo (JP); Shoh Nagamine, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/333,330

(22) Filed: Oct. 25, 2016

(65) Prior Publication Data

US 2017/0134695 A1 May 11, 2017

(30) Foreign Application Priority Data

Nov. 6, 2015 (JP) .................................. 2015-218540

(51) Int. Cl.
*H04N 7/15* (2006.01)
*H04N 7/14* (2006.01)
*H04L 29/06* (2006.01)

(52) U.S. Cl.
CPC .............. *H04N 7/147* (2013.01); *H04N 7/15* (2013.01); *H04L 65/403* (2013.01)

(58) Field of Classification Search
None
See application file for complete search history.

(56) References Cited

U.S. PATENT DOCUMENTS

| 2011/0206128 A1* | 8/2011 | Jun ..................... H04N 21/2343 375/240.16 |
| 2012/0102210 A1* | 4/2012 | Kudo .................. H04L 65/1006 709/228 |
| 2013/0232273 A1* | 9/2013 | Lawn ..................... H04L 65/80 709/228 |
| 2013/0266289 A1* | 10/2013 | Oyman .................. H04N 13/00 386/248 |
| 2013/0331032 A1* | 12/2013 | Kumar ................ H04M 1/7253 455/41.2 |
| 2015/0229681 A1 | 8/2015 | Tsubone et al. |

FOREIGN PATENT DOCUMENTS

| JP | H10-051557 | 2/1998 |
| JP | 2015-154196 | 8/2015 |

* cited by examiner

*Primary Examiner* — Creighton Smith
(74) *Attorney, Agent, or Firm* — IPUSA, PLLC

(57) ABSTRACT

An information processing system includes a first information processing terminal and an information processing apparatus coupled to the first information processing terminal. The information processing system includes a storage unit configured to store codec data indicating a codec that can be used for performing communication between the first information processing terminal and a second information processing terminal other than the first information processing terminal; and a determining unit configured to make a first determination of determining whether there is a codec that can be used by both the first information processing terminal and the second information processing terminal, based on the codec data.

7 Claims, 14 Drawing Sheets

INFORMATION PROCESSING SYSTEM, INFORMATION PROCESSING APPARATUS, AND INFORMATION PROCESSING METHOD

CROSS-REFERENCE TO RELATED APPLICATION

The present application claims the benefit of priority under 35 U.S.C. §119 of Japanese Patent Application No. 2015-218540, filed on Nov. 6, 2015, the contents of which are incorporated herein by reference in their entirety.

BACKGROUND OF THE INVENTION

1. Field of the Invention

The present invention relates to an information processing system, an information processing apparatus, and an information processing method.

2. Description of the Related Art

In the related art, there is known a method of performing a so-called TV conference by transmitting images, etc., to each other, at multiple locations.

For example, there is known a method of temporarily connecting a new TV conference terminal during a TV conference, in order to determine whether to allow the new TV conference terminal to participate in the TV conference. Specifically, first, during a TV conference, a temporary connection process is performed with the new TV conference terminal, and inter-terminal communication is established with the new TV conference terminal. Next, a TV conference terminal sends an own image to the new TV conference terminal, and the own terminal sending the own image switches to a mode of receiving an image sent from the new TV conference terminal. Next, when it is determined to allow the participation of the new TV conference terminal, an additional process is performed. On the other hand, when it is determined not to allow the participation of the new TV conference terminal, a disconnection process is performed (see, for example, Patent Document 1).

Patent Document 1: Japanese Unexamined Patent Application Publication No. H10-51557

SUMMARY OF THE INVENTION

An aspect of the present invention provides an information processing system, an information processing apparatus, and an information processing method, in which one or more of the above-described disadvantages are reduced.

According to one aspect of the present invention, there is provided an information processing system including a first information processing terminal and an information processing apparatus coupled to the first information processing terminal, the information processing system including a storage unit configured to store codec data indicating a codec that can be used for performing communication between the first information processing terminal and a second information processing terminal other than the first information processing terminal; and a determining unit configured to make a first determination of determining whether there is a codec that can be used by both the first information processing terminal and the second information processing terminal, based on the codec data.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
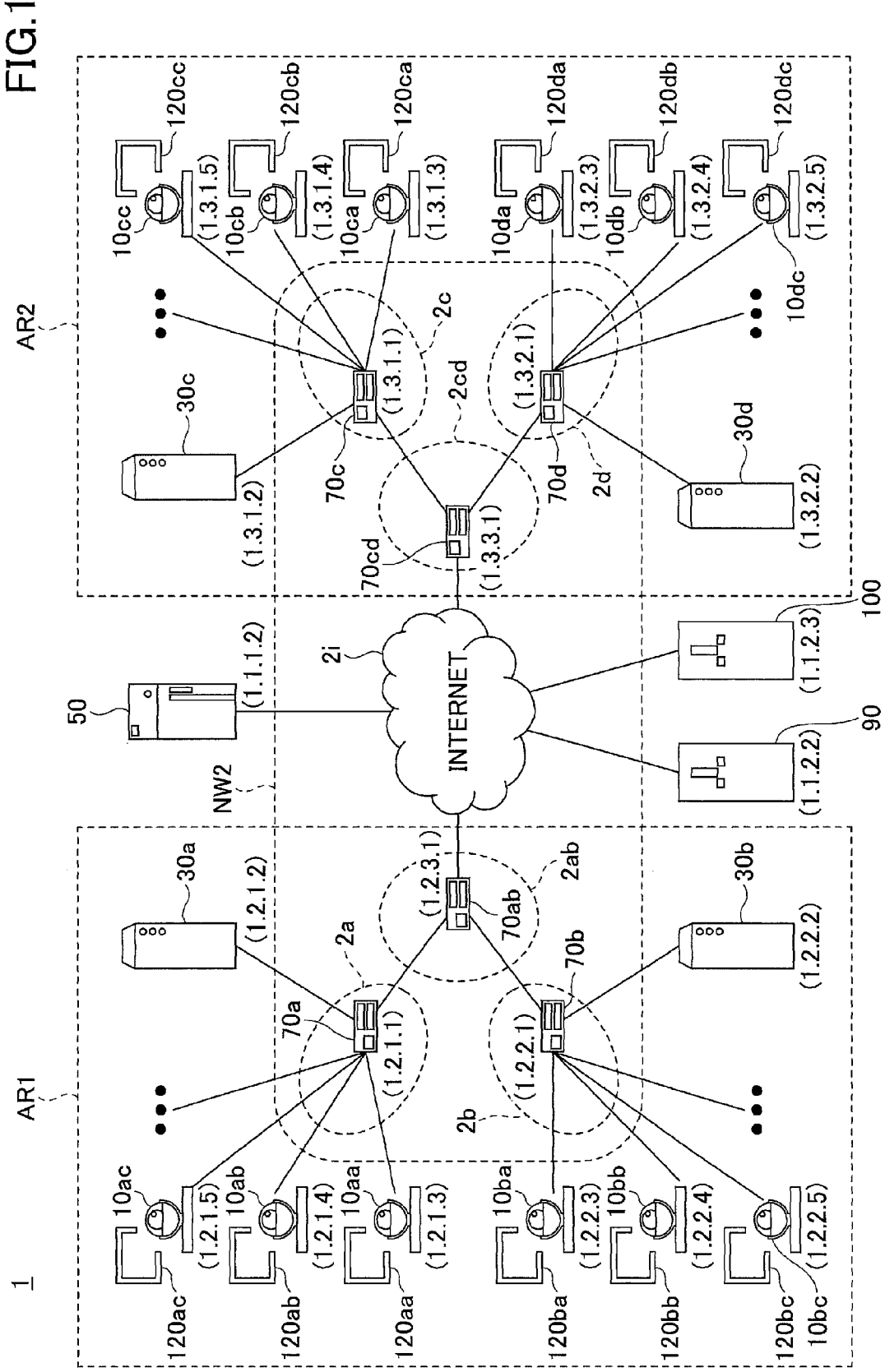
FIG. 1 is a schematic diagram illustrating an example of an overall configuration of an information processing system according to an embodiment of the present invention.

In the related art, there is a problem in that it is often unclear as to whether the information processing terminals communicating with each other are able to use a common codec.

A problem to be solved by an embodiment of the present invention is to provide an information processing system capable of indicating whether there is a codec that can be used by an information processing terminal.

Embodiments of the present invention will be described by referring to the accompanying drawings. Note that elements that have substantially the same functions are denoted by the same reference numerals, and overlapping descriptions are omitted.

Example of Overall Configuration

FIG. 1 is a schematic diagram illustrating an example of an overall configuration of an information processing system according to an embodiment of the present invention. In the following, a description is given of an information processing system 1 illustrated in FIG. 1.

The information processing system 1 is a transmission system for transmitting content data, etc., a communication system for performing communication between a plurality of information processing terminals, or a combination of these systems, etc. That is, in the information processing system 1, data indicating an image, voice sound, or a combination of an image and voice sound, is sent and received to perform communication. Note that an image is a still image, a video, or a combination of a still image and a video. For example, the information processing system 1 is a so-called TV conference system or a TV telephone system, etc. In the following, a description is given of an example in which the information processing system 1 is a TV conference system.

In the following description of the example of the TV conference system, the information processing terminal that is the so-called request source that requests to start a TV conference is referred to as a "request source terminal". Furthermore, in the following description, the information processing terminal that is the so-called request destination that receives the request to start a TV conference is referred to as a "destination terminal".

In the illustrated example, the information processing system 1 includes a plurality of information processing terminals 10aa through 10dc that are examples of first information processing terminals and second information processing terminals. Note that in this example, the information processing terminals 10aa through 10dc respectively include displays 120aa through 120dc.

In the illustrated example, among the plurality of information processing terminals, the information processing terminals 10aa through 10bc are installed in a first area AR1. On the other hand, among the plurality of information processing terminals, the information processing terminals 10cc through 10dc are installed in a second area AR2. In the following, among the information processing terminals 10aa through 10dc, any one of the information processing terminals may be referred to as the "terminal 10" or the "information processing terminal 10".

In the illustrated example, in order to send and receive content data, etc., among the plurality of information processing terminals, relay devices 30a through 30d relay the communication. In the following, among the relay devices 30a through 30d, any one of the relay devices may be referred to as the "relay device 30".

In the illustrated example, a management system 50 that is an example of an information processing apparatus performs so-called login authentication, etc., when the user performs an operation for login at the terminal 10. Also, the management system 50 manages the call status of the terminal 10, a destination list, and the communication status of the relay device 30, etc.

In the illustrated example, a plurality of routers 70a, 70b, 70c, 70d, 70ab, and 70cd are used. In the following, among the plurality of routers 70a, 70b, 70c, 70d, 70ab, and 70cd, any one of the routers may be referred to as the "router 70". Each router 70 selects the optimum path for sending and receiving data.

In the illustrated example, a program providing system 90 is used. The program providing system 90 includes a storage device such as a hard disk. Furthermore, the program providing system 90 stores a terminal-use program for causing the terminal 10 to realize various functions or for causing the terminal 10 to function as various units. Furthermore, the program providing system 90 can send the stored terminal-use program to the terminal 10. Similarly, the program providing system 90 also stores a relay device-use program for causing the relay device 30 to realize various functions or for causing the relay device 30 to function as various units. Furthermore, the program providing system 90 can send the stored relay device-use program to the relay device 30. Furthermore, the program providing system 90 also stores a management system-use program for causing the management system 50 to realize various functions or for causing the management system 50 to function as various units. Furthermore, the program providing system 90 can send the stored management-use program to the management system 50.

In the illustrated example, a maintenance system 100 is used. The maintenance system 100 is a computer for maintaining, managing, or repairing the terminal 10, the relay device 30, the management system 50, and the program providing system 90, etc. For example, when the maintenance system 100 is disposed domestically. On the other hand, the terminal 10, the relay device 30, the management system 50, and the program providing system 90 are disposed overseas. In this case, the maintenance system 100 maintains, manages, or repairs the terminal 10, the relay device 30, the management system 50, and the program providing system 90 via a communication network 2. The maintenance system 100 maintains the machine number, the manufacturing number, the sales destination, and the repair and inspection, or manages the failure history, with respect to the terminal 10, the relay device 30, the management system 50, and the program providing system 90.

As illustrated, the information processing terminals 10aa through 10ac, the relay device 30a, and the router 70a, etc., are communicatively connected by a LAN 2a. Furthermore, the information processing terminals 10ba through 10bc, the relay device 30b, and the router 70b, etc., are communicatively connected by a LAN 2b. Furthermore, the LAN 2a and the LAN 2b are communicatively connected by an exclusive-use line 2ab including the router 70ab. The LAN 2a and the LAN 2b are constructed in a predetermined first area AR1. For example, the first area AR1 is Japan. Furthermore, the LAN 2a is constructed in a business office in Tokyo, and the LAN 2b is constructed in a business office in Osaka.

On the other hand, the information processing terminals 10ca through 10cc, the relay device 30c, and the router 70c, etc., are communicatively connected by a LAN 2c. Furthermore, the information processing terminals 10da through 10dc, the relay device 30d, and the router 70d, etc., are communicatively connected by a LAN 2d. Furthermore, the LAN 2c and the LAN 2d are communicatively connected by an exclusive-use line 2cd including the router 70cd. The LAN 2c and the LAN 2d are constructed in a predetermined second area AR2. For example, the second area AR2 is the USA. Furthermore, the LAN 2c is constructed in a business office in New York, and the LAN 2*d* is constructed in a business office in Washington D.C. The first area AR1 and the second area AR2 are communicatively connected to each other via the Internet 2*i* from the respective routers.

As illustrated, the management system 50 and the program providing system 90 are communicatively connected with the terminals 10 and the relay devices 30, etc., via the Internet 2*i*. Note that the management system 50 and the program providing system 90 may be disposed in the first area AR1 or the second area AR2 or in another area.

In the illustrated example, in the information processing system 1, the communication network 2 is constructed by the LAN 2*a*, the LAN 2*b*, the LAN 2*c*, the LAN 2*d*, the exclusive-use line 2*ab*, the exclusive-use line 2*cd*, and the Internet 2*i*. Note the communication network 2 may not only use wired communication, but may also use wireless communication by Wireless Fidelity (WiFi) and Bluetooth (registered trademark), etc.

Note that FIG. 1 illustrates IP addresses set for the respective devices and systems. In FIG. 1, the IP address is an example of IPv4. For example, for the information processing terminal 10*aa*, an IP address "(1.2.1.3)" is set. Note that the IP address may be IPv6, etc.

Furthermore, the terminals 10 are not limited to communication for making calls between a plurality of business offices or calls between different rooms in the same business office. For example, the terminals 10 may also perform communication for making calls within the same room and calls between an outdoor location and an indoor location, etc. Note that when the terminals 10 are used outdoors, wireless communication may be performed by a mobile phone communication network, etc.

Figure 2:
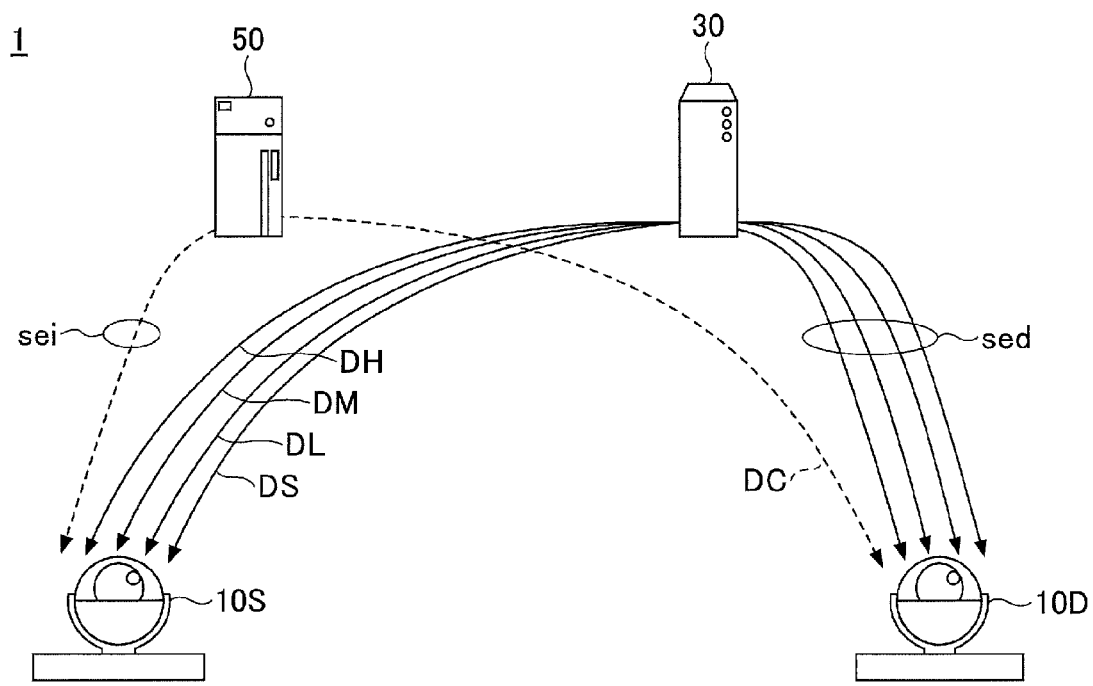
FIG. 2 is a conceptual diagram illustrating an example of communication by the information processing system according to an embodiment of the present invention.

FIG. 2 is a conceptual diagram illustrating an example of communication by the information processing system 1 according to an embodiment of the present invention. As illustrated, in the information processing system 1, any one of the information processing terminals 10*aa* through 10*dc* (FIG. 1) becomes a request source terminal 10S. On the other hand, any one of the information processing terminals 10*aa* through 10*dc* other than the request source terminal 10S, becomes a destination terminal 10D.

First, in the information processing system 1, between the request source terminal 10S and the destination terminal 10D, a management information session sei is established for sending and receiving various kinds of management information DC via the management system 50.

Furthermore, between the request source terminal 10S and the destination terminal 10D, high resolution image data DH, medium resolution image data DM, low resolution image data DL, and voice sound data DS, etc., are sent and received. Note that four sessions are established for sending and receiving data such as the high resolution image data DH, the medium resolution image data DM, the low resolution image data DL, and the voice sound data DS, etc. In the following, these four sessions are collectively indicated as an image and voice sound data session sed. As illustrated, image data and voices sound data, etc., are sent and received via the relay device 30, by the image and voice sound data session sed.

Figure 3A:
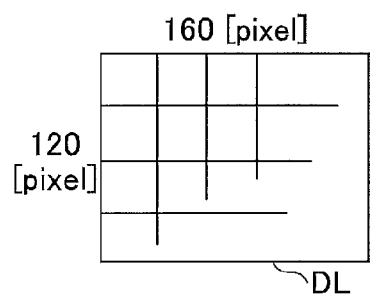
FIGS. 3A through 3C are schematic diagrams illustrating examples of the image quality of images sent and received by the information processing system according to an embodiment of the present invention.
Figure 3B:
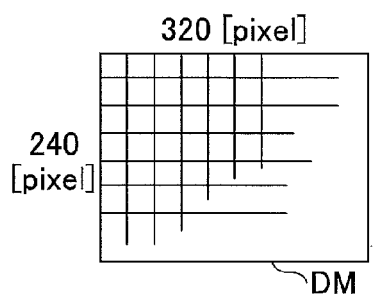
Figure 3C:
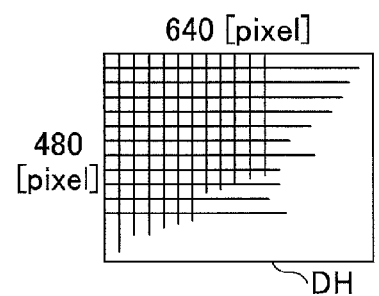

FIGS. 3A through 3C are schematic diagrams illustrating examples of the image quality of images sent and received by the information processing system 1 according to an embodiment of the present invention. For example, an image indicated by the low resolution image data DL is an image illustrated in FIG. 3A. For example, an image indicated by the medium resolution image data DM is an image illustrated in FIG. 3B. For example, an image indicated by the high resolution image data DH is an image illustrated in FIG. 3C.

Specifically, for example, an image indicated by the low resolution image data DL is an image including 160 pixels in the horizontal direction and 120 pixels in the vertical direction. Furthermore, for example, an image indicated by the medium resolution image data DM is an image including 320 pixels in the horizontal direction and 240 pixels in the vertical direction. Furthermore, for example, an image indicated by the high resolution image data DH is an image including 640 pixels in the horizontal direction and 480 pixels in the vertical direction.

For example, when the data is transmitted through a narrow bandwidth path, the low resolution image data DL is sent and received. On the other hand, when the data is transmitted through a relatively wide bandwidth path, the low resolution image data DL and the medium resolution image data DM are sent and received. Furthermore, when the data is transmitted through an even wider bandwidth path, the low resolution image data DL, the medium resolution image data DM, and the high resolution image data DH are sent and received.

Example of Hardware Configuration

Figure 4:
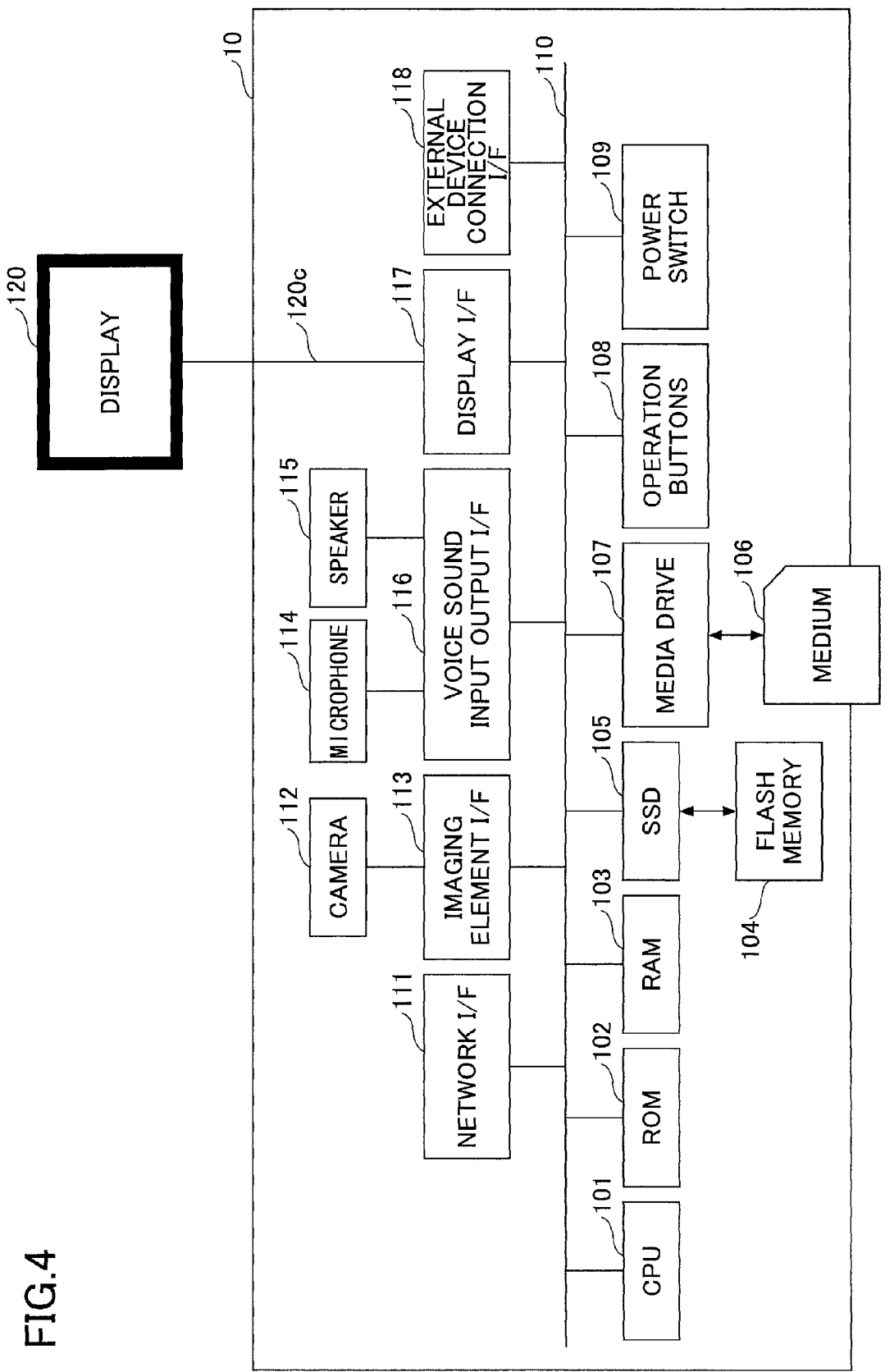
FIG. 4 is a block diagram illustrating an example of a hardware configuration of an information processing terminal according to an embodiment of the present invention.

FIG. 4 is a block diagram illustrating an example of a hardware configuration of the information processing terminal 10 according to an embodiment of the present invention. As illustrated, the terminal 10 includes a Central Processing Unit (CPU) 101, a Read-Only Memory (ROM) 102, and a Random Access Memory (RAM) 103. Furthermore, the terminal 10 includes a flash memory 104, a Solid State Drive (SSD) 105, a media drive 107, operation buttons 108, and a power switch 109. Furthermore, the terminal 10 includes a network interface (I/F) 111, a camera 112, an imaging element I/F 113, a microphone 114, a speaker 115, a voice sound input output I/F 116, a display I/F 117, and an external device connection I/F 118. Furthermore, the hardware elements are connected by a bus line 110. That is, the terminal 10 is a computer.

The CPU 101 is an arithmetic device for performing calculations to realize processes and data processing executed by the terminal 10. Furthermore, the CPU 101 is a control device for controlling the hardware elements. Therefore, the overall operations of the terminal 10 are controlled by the CPU 101.

The ROM 102, the RAM 103, the flash memory 104, and the SSD 105 are examples of storage devices. For example, the ROM 102 stores a program used for driving the CPU 101, such as an Initial Program Loader (IPL). Furthermore, the RAM 103 is an example of a main memory, and is used as a work area, etc., of the CPU 101. Furthermore, in the flash memory 104, the SSD 105 stores data such as the terminal-use program, image data, and voice sound data, etc., based on control by the CPU 101.

The media drive 107 connects a medium 106 that is a recording medium such as a flash memory and an optical disk, etc., to the terminal 10. Furthermore, the media drive 107 reads and writes data with respect to the medium 106.

The operation buttons 108 are an example of an input device for inputting operations by a user. For example, the operation buttons 108 are used when the terminal 10 selects a destination with which communication is to be performed, etc.

The power switch 109 is used for the operation of switching the power of the terminal 10 between on and off.

The network I/F 111 is an interface for connecting the terminal 10 to a network. For example, the network I/F 111 sends and receives data with an external device via a communication network.

The camera 112 captures an image of a subject and generates image data. Furthermore, the camera 112 is controlled by the imaging element I/F 113. That is, for example, the imaging element I/F 113 sends the image data generated by the camera 112 to an external device via a communication network.

The microphone 114 inputs voice sound and generates voice sound data. Furthermore, the speaker 115 outputs voice sound based on the voice sound data. The voice sound input output I/F 116 controls the microphone 114 and the speaker 115.

The display I/F 117 connects the display 120 to the terminal 10 by a cable 120c. The display 120 is an example of an output device for displaying images and icons used for operations, etc. The cable 120c may be a cable for analog Red/Green/Blue (RGB) (Video Graphics Array (VGA)) signals, a cable for a component video, or a cable for High-Definition Multimedia Interface (HDMI) (registered trademark) or Digital VideoInteractive (DVI).

Figure 5:
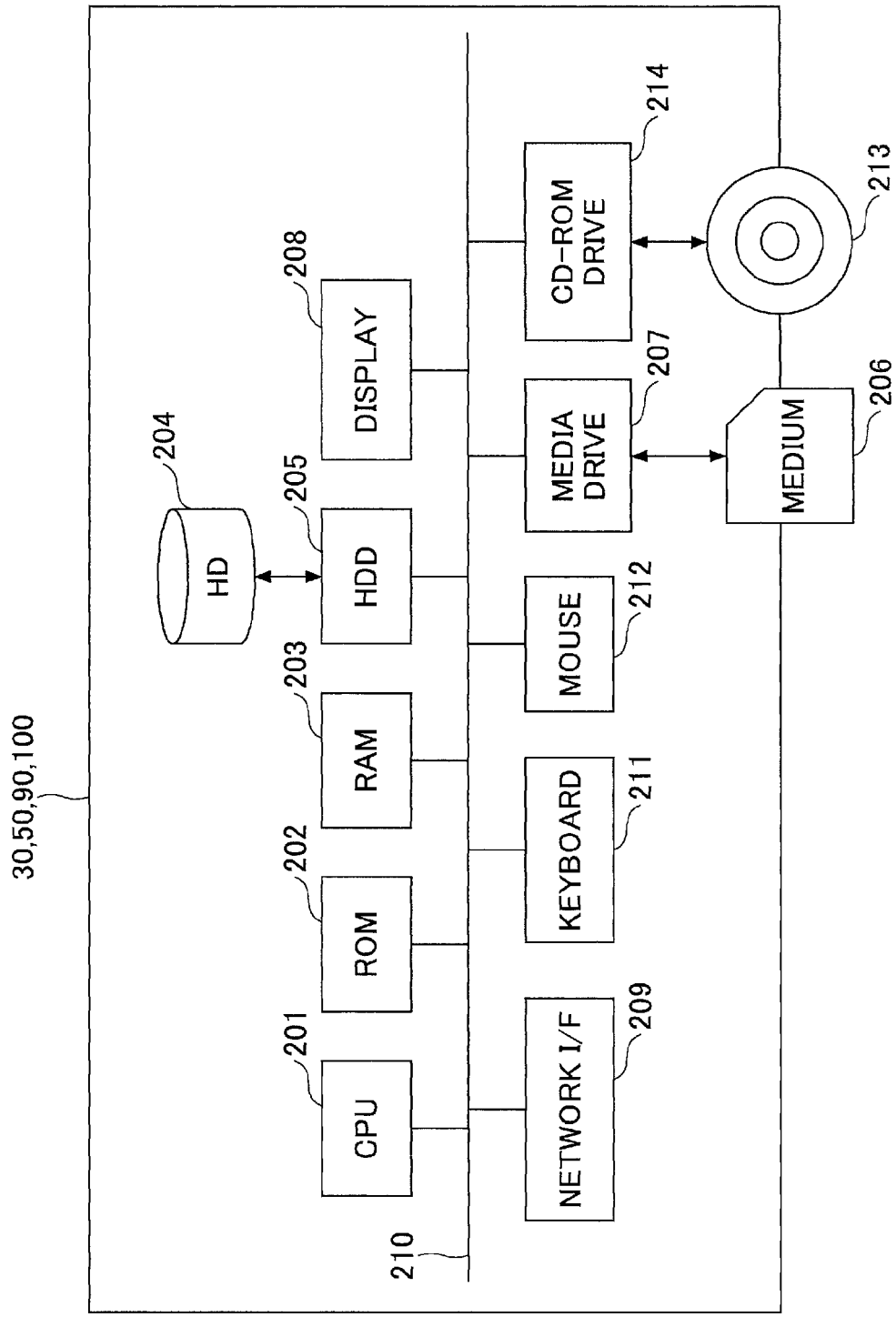
FIG. 5 is a block diagram illustrating an example of a hardware configuration of an information processing apparatus according to an embodiment of the present invention.

FIG. 5 is a block diagram illustrating an example of a hardware configuration of an information processing apparatus according to an embodiment of the present invention. As illustrated, the relay device 30, the management system 50, the program providing system 90, and the maintenance system 100 have the same hardware configuration. In the following, a description is given of the relay device 30, assuming that the relay device 30, the management system 50, the program providing system 90, and the maintenance system 100 have the same hardware configuration.

The relay device 30 includes a CPU 201, a ROM 202, a RAM 203, a Hard Disk (HD) 204, a HD Drive (HDD) 205, a media drive 207, a display 208, and a network I/F 209. Furthermore, the relay device 30 includes a network I/F 209, a keyboard 211, a mouse 212, and a compact disc read-only memory (CD-ROM) drive 214, etc. Furthermore, the hardware elements are connected by a bus line 210. That is, the relay device 30 is a computer.

The CPU 201 is an arithmetic device for performing calculations to realize processes and data processing executed by the relay device 30. Furthermore, the CPU 201 is a control device for controlling the hardware elements. Therefore, the overall operations of the relay device 30 are controlled by the CPU 201.

The ROM 202, the RAM 203, the HD 204, and the HDD 205 are examples of storage devices. For example, the ROM 202 stores a program for used driving the CPU 201, such as an IPL. Furthermore, the RAM 203 is an example of a main memory, and is used as a work area, etc., of the CPU 201. Furthermore, in the HD 204, the HDD 205 stores data such as the relay device-use program, image data, and voice sound data, etc., based on control by the CPU 201.

The media drive 207 connects a medium 206 that is a recording medium such as a flash memory and an optical disk, etc., to the relay device 30. Furthermore, the media drive 207 reads and writes data with respect to the medium 206.

The display 208 is an example of an output device for displaying images and icons used for operations, etc.

The network I/F 209 is an interface for connecting the relay device 30 to a network. For example, the network I/F 209 sends and receives data with an external device via a communication network.

The keyboard 211 and the mouse 212 are examples of input devices for inputting operations by the user.

The CD-ROM drive 214 connects a medium 213 that is a recording medium such as a CD-ROM, to the relay device 30. Furthermore, the CD-ROM drive 214 reads and writes data with respect to the medium 213.

Example of Functional Configuration

Figure 6:
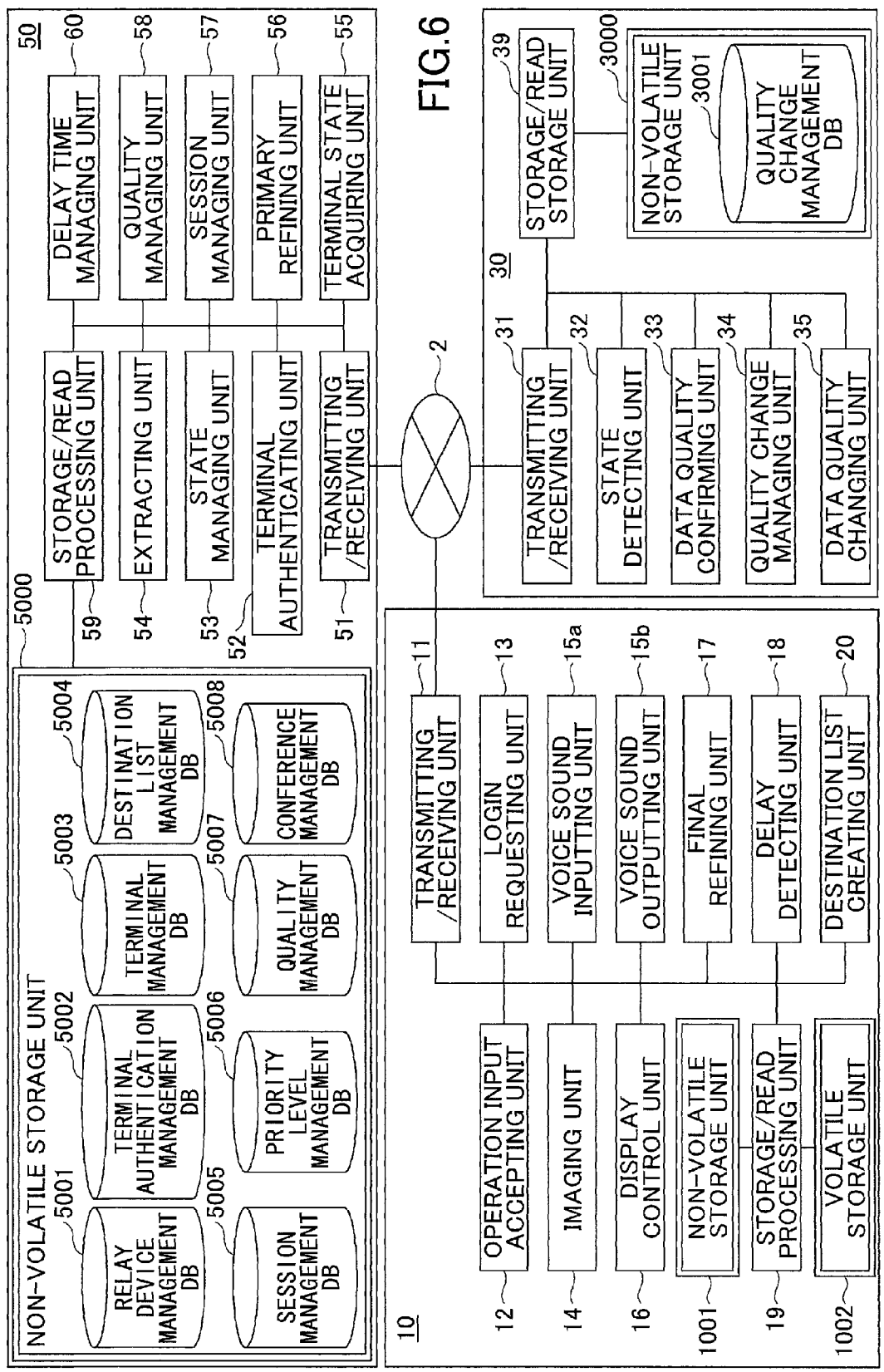
FIG. 6 is a functional block diagram illustrating an example of a functional configuration of the information processing system according to an embodiment of the present invention.

FIG. 6 is a functional block diagram illustrating an example of a functional configuration of the information processing system 1 according to an embodiment of the present invention.

For example, the terminal 10 includes a transmitting/receiving unit 11, an operation input accepting unit 12, a login requesting unit 13, an imaging unit 14, a voice sound inputting unit 15a, a voice sound outputting unit 15b, a display control unit 16, a final refining unit 17, a delay detecting unit 18, a storage/read processing unit 19, and a destination list creating unit 20. Furthermore, the terminal 10 includes a non-volatile storage unit 1001 and a volatile storage unit 1002.

The transmitting/receiving unit 11 sends and receives data with an external device via the communication network 2. Note that the transmitting/receiving unit 11 is realized by, for example, the network I/F 111 (FIG. 4). Furthermore, before starting a call with a destination terminal, the transmitting/receiving unit 11 receives data, etc., indicating the state of each of the terminals that are candidate destinations, from the management system 50. Note that the data indicating the state of each terminal is not limited to the operating state of each terminal. For example, the data indicating the state of each terminal may also indicate states such as whether the terminal is in an online state or an offline state, whether the terminal is in an online state and during a call, or the user is away from the terminal, etc. Furthermore, the data indicating the state of each terminal may also indicate various states such as a cable is removed from one of the terminals, voice sound is output but images cannot be output, and voice sound cannot be output (a so-called mute state), etc.

The operation input accepting unit 12 accepts various kinds of operations from the user. Note that the operation input accepting unit 12 is realized by, for example, the operation buttons 108 (FIG. 4) and the power switch 109 (FIG. 4), etc.

The login requesting unit 13 requests login when the power is turned on. Note that the login requesting unit 13 is realized by, for example, the CPU 101 (FIG. 4) and the network I/F 111 (FIG. 4), etc. Specifically, when the power is turned on, the login requesting unit 13 sends data indicating a request to log in and the IP address of the request source terminal, etc., to the management system 50 via the communication network 2. On the other hand, when the power is turned off, the login requesting unit 13 sends data indicating power off, etc., to the management system 50 via the communication network 2. Accordingly, the management system 50 is able to recognize whether the power of each terminal is on or off, etc.

The imaging unit 14 captures an image of a subject such as a user, generates image data, and outputs the image data. Note that the imaging unit 14 is realized by, for example, the camera 112 (FIG. 4) and the imaging element I/F 113 (FIG. 4), etc.

The voice sound inputting unit 15a inputs voice sound of a user's voice, etc., and generates voice sound data. Note that the voice sound inputting unit 15a is realized by, for example, the microphone 114 (FIG. 4) and the voice sound input output I/F 116 (FIG. 4), etc.

The voice sound outputting unit 15b outputs voice sound based on the received voice sound data. Note that the voice sound outputting unit 15b is realized by, for example, the speaker 115 (FIG. 4) and the voice sound input output I/F 116 (FIG. 4), etc.

The display control unit 16 implements control for displaying images, etc., on the display 120 (FIG. 4), etc. Note that the display control unit 16 is realized by, for example, the display I/F 117 (FIG. 4).

The final refining unit 17 finally narrows down a plurality of relay devices to one relay device. Note that the final refining unit 17 is realized by, for example, the CPU 101 (FIG. 4), etc.

The delay detecting unit 18 detects the delay time (in units of milliseconds, etc.) of the voice sound data and the image data received from an external device. Note that the delay detecting unit 18 is realized by, for example, the CPU 101 (FIG. 4), etc.

The storage/read processing unit 19 writes data to be stored and reads stored data with respect to the non-volatile storage unit 1001 and the volatile storage unit 1002. Note that the storage/read processing unit 19 is realized by, for example, the SSD 105 (FIG. 4), etc. For example, the non-volatile storage unit 1001 stores terminal identification (ID) for identifying the terminal 10 and a password, etc. Furthermore, the volatile storage unit 1002 stores image data and voice sound data, etc., that are received in a call. In this case, the image data and voice sound data stored in the volatile storage unit 1002 is overwritten in the volatile storage unit 1002, every time the data is received. Images and voice sound are output based on the image data and voice sound data stored in the volatile storage unit 1002.

The destination list creating unit 20 creates and updates a destination list indicating terminals that are candidate destinations, based on a destination list and data indicating the states of the terminals that are candidate destinations received from the management system 50. Note that the destination list creating unit 20 is realized by, for example, the network I/F 111 (FIG. 4), etc.

Note that the IDs such as the terminal ID and the relay device ID, etc., indicates a character, a symbol, or a mark, a figure, a value, or a combination of these items, for uniquely identifying the respective devices.

The relay device 30 includes a transmitting/receiving unit 31, a state detecting unit 32, a data quality confirming unit 33, a quality change managing unit 34, a data quality changing unit 35, a storage/read storage unit 39, and a non-volatile storage unit 3000.

In the non-volatile storage unit 3000, a quality change management database (DB) 3001 is constructed by a quality change management table as follows (table 1).

TABLE 1

| IP ADDRESS OF RELAY DESTINATION TERMINAL | IMAGE QUALITY OF IMAGE DATA TO BE RELAYED (QUALITY OF IMAGE) |
|---|---|
| 1.3.2.4 | HIGH IMAGE QUALITY |
| 1.3.1.3 | MEDIUM IMAGE QUALITY |
| 1.3.2.3 | LOW IMAGE QUALITY |
| . . . | . . . |

In the above quality change management table, the IP address of the terminal 10 indicating the relay destination of the image data and the image quality of the image to be relayed by this terminal 10, etc., are managed.

The transmitting/receiving unit 31 sends and receives data with an external device via the communication network 2. Note that the transmitting/receiving unit 31 is realized by, for example, the network I/F 209 (FIG. 5).

The state detecting unit 32 detects the operating state, etc., of the relay device 30. For example, as the operating state, there are states including "online", "offline", "during call", and "temporarily interrupted", etc. Note that the state detecting unit 32 is realized by, for example, the CPU 201 (FIG. 5), etc.

The data quality confirming unit 33 uses, for example, the IP address of the destination terminal as a search key to search the quality change management DB 3001. The data quality confirming unit 33 extracts the image quality of the image data that is to be relayed by this search, to confirm the image quality of the image data to be relayed. Note that the data quality confirming unit 33 is realized by, for example, the CPU 201 (FIG. 5), etc.

The quality change managing unit 34 changes the quality change management DB 3001 based on data indicating the quality received from the management system 50. For example, it is assumed that image data indicating images having high image quality are to be sent and received between a request source terminal having a terminal ID of "01aa" and a destination terminal having a terminal ID of "01db", to hold a TV conference. Note that in this example, the request source terminal is the information processing terminal 10aa and the destination terminal is the information processing terminal 10db that are illustrated in FIG. 1.

In addition to this TV conference, it is assumed that another TV conference is held, in which the request source terminal is the information processing terminal 10bb and the destination terminal is the information processing terminal 10ca. In this case, two TV conferences are held, and therefore the bandwidth used for sending and receiving data may become narrower than the bandwidth used when only one TV conference is held. Therefore, for example, a delay may occur in the reception of image data at the information processing terminal 10db. When this kind of delay occurs, the relay device 30 decreases the image quality of the image indicated by the image data being relayed up to the present time. For example, when images of high image quality have been sent and received, the relay device 30 switches to sending and receiving images of medium image quality. Furthermore, when the image quality is decreased, etc., the relay device 30 changes the quality change management DB 3001 based on the data indicating that images of medium image quality are sent and received. Note that the quality change managing unit 34 is realized by, for example, the CPU 201 (FIG. 5), etc.

The data quality changing unit 35 changes the image quality of the image indicated by the image data received from a request source terminal, based on the quality change management DB 3001. Note that the data quality changing unit 35 is realized by, for example, the CPU 201 (FIG. 5), etc.

The storage/read storage unit 39 writes data to be stored and reads stored data with respect to the non-volatile storage unit 3000. Note that the storage/read storage unit 39 is realized by, for example, the HDD 205 (FIG. 5), etc.

The management system 50 includes a transmitting/receiving unit 51, a terminal authenticating unit 52, a state managing unit 53, an extracting unit 54, a terminal state acquiring unit 55, a primary refining unit 56, a session managing unit 57, a quality managing unit 58, a storage/read processing unit 59, a delay time managing unit 60, and a non-volatile storage unit 5000.

In the non-volatile storage unit 5000, a relay device management DB 5001 is constructed by a relay device management table as follows (table 2).

TABLE 2

| RELAY DEVICE ID | OPER- ATING STATE | RECEPTION TIME AND DATE | IP ADDRESS OF RELAY DEVICE | MAXIMUM DATA TRANS- MISSION SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

In the above relay device management table, the operating state of each relay device 30, the time and date at which the data indicating the operating state is received at the management system 50, the IP address of the relay device 30, and the maximum data transmission speed at the relay device 30, etc., are managed in association with each other for each relay device ID. For example, the above relay device management table indicates that with respect to the relay device having a relay device ID of "111a", the operating state is "online". Furthermore, the time and date at which the data indicating the operating state of the relay device 30 having a relay device ID of "111a" is received at the management system 50, is "Nov. 10, 2009, 13:00". Furthermore, the IP address of the relay device 30 having a relay device ID of "111a" is "1.2.1.2". Furthermore, the maximum data transmission speed of the relay device having a relay device ID of "111a" is "100 (megabits per second (Mbps))".

In the non-volatile storage unit 5000, a terminal authentication management DB 5002 is constructed by a terminal authentication management table as follows (table 3).

TABLE 3

| TERMINAL ID | PASSWORD |
|---|---|
| 01aa | aaaa |
| 01ab | abab |
| 01ba | baba |
| . . . | . . . |

In the above terminal authentication management table, a password is managed in association with each terminal ID. For example, the terminal ID of the information processing terminal 10aa (FIG. 1) is "01aa", and a password "aaaa" is associated with this terminal ID.

In the non-volatile storage unit 5000, a terminal management DB 5003 is constructed by a terminal management table as follows (table 4).

TABLE 4

| TERMINAL ID | DESTINATION NAME | OPERATING STATE | RECEPTION TIME AND DATE | IP ADDRESS OF TERMINAL | Codec Video/Audio |
|---|---|---|---|---|---|
| 01aa | JAPAN, SAPPORO OFFICE, TERMINAL AA | ONLINE (DURING CONFERENCE) | 2009.11.10.13:40 | 1.2.1.3 | H264, H265/ Speex, Opus |
| 01ab | JAPAN, SAPPORO OFFICE, TERMINAL AB | ONLINE (NOT DURING CONFERENCE) | 2009.11.09.12:00 | 1.2.1.4 | H264/Speex |
| . . . | . . . | . . . | . . . | . . . | . . . |
| 01ba | JAPAN, HAKODATE OFFICE, TERMINAL BA | ONLINE (NOT DURING CONFERENCE) | 2009.11.10.13:45 | 1.2.2.3 | H264, H265/ Speex, Opus |
| 01bb | JAPAN, HAKODATE OFFICE, TERMINAL BB | ONLINE (DURING CONFERENCE) | 2009.11.10.13:50 | 1.2.2.4 | H264, H265/ Speex, Opus |
| . . . | . . . | . . . | . . . | . . . | . . . |
| 01ca | JAPAN, ASAHIKAWA OFFICE, TERMINAL CA | ONLINE (NOT DURING CONFERENCE) | 2009.11.10.12:45 | 1.3.1.3 | H265/Opus |
| 01cb | JAPAN, ASAHIKAWA OFFICE, TERMINAL CB | ONLINE (DURING CONFERENCE) | 2009.11.10.13:55 | 1.3.1.4 | H264, H265/ Speex, Opus |
| . . . | . . . | . . . | . . . | . . . | . . . |
| 01da | JAPAN, KUSHIRO OFFICE, TERMINAL DA | ONLINE (DURING CONFERENCE) | 2009.11.08.12:45 | 1.3.2.3 | H264/Speex |
| 01db | JAPAN, KUSHIRO OFFICE, TERMINAL DB | ONLINE | 2009.11.10.12:45 | 1.3.2.4 | H265/Opus |
| . . . | . . . | . . . | . . . | . . . | . . . |

In the above terminal management table, a destination name, the state of the terminal 10, the IP address, a codec that can be used by the terminal 10, and the time and date at which these data items have been received at the management system 50, etc., are managed in association with each other for each terminal ID. For example, the terminal ID of the information processing terminal 10aa (FIG. 1) is "01aa", and an IP address "1.2.1.3" is associated with this terminal ID. Furthermore, as the destination of this terminal 10aa, "Japan, Sapporo office, terminal AA" is associated with this terminal ID. Furthermore, the state of the terminal 10aa "online (during conference)" is associated with this terminal ID. Furthermore, the codecs that can be used by this terminal 10aa, "H264", "H265/Speex", and "H265/Opus" are associated with this terminal ID. Furthermore, the reception time and date of this data "Nov. 10, 2009, 13:40" is associated with this terminal ID.

In the non-volatile storage unit 5000, a destination list management DB 5004 is constructed by a destination list management table as follows (table 5).

TABLE 5

| REQUEST SOURCE TERMINAL ID | DESTINATION TERMINAL ID |
|---|---|
| 01aa | 01ab, . . . , 01ba, 01bb, . . . , 01ca, 01cb, 01da, 01db, . . . |
| 01ab | 01aa, 01ca, 01cb |
| 01ba | 01aa, 01ab, 01ca, 01cb, 01da, 01db |
| . . . | . . . |
| 01db | 01aa, 01ab, 01ba, . . . , 01da, 01ca, 01cb, . . . 01da |

In the above destination list management table, a terminal ID of a destination terminal is associated with a terminal ID of a request source terminal, in a TV conference. For example, a request source terminal having a terminal ID "01aa" is able to have a terminal having a terminal ID of "01ab" as a destination terminal. As described above, in the destination list management table, a terminal that is a candidate destination terminal is associated with the request source terminal. A terminal that is a candidate destination terminal is updated by addition or deletion, when an addition request or a deletion request is made to the management system 50.

In the non-volatile storage unit 5000, a session management DB 5005 is constructed by a session management table as follows (table 6).

TABLE 6

| SELECTION SESSION ID | RELAY DEVICE ID | REQUEST SOURCE TERMINAL ID | DESTINATION TERMINAL ID | DELAY TIME (ms) | RECEPTION TIME AND DATE |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| . . . | . . . | . . . | . . . | . . . | . . . |

In the above session management table, data is managed for each session ID that is used for executing a session for selecting the relay device 30. The managed data includes a relay device ID, a terminal ID of the request source terminal, a terminal ID of the destination terminal, the delay time, and the time and date at which these data items have been received at the management system 50, etc. For example, the relay device ID "111a" of the relay device 30 selected in a session having a selection session ID "se1", is associated with this session ID. Furthermore, the relay device 30 having the relay device ID "111a" relays image data and voice sound data, etc., between the request source terminal having a terminal ID "01aa" and the destination terminal having a terminal ID "01db". In this relaying process, at the destination terminal at the time point "Nov. 10, 2009, 14:00", the delay time of the received data is "200 milliseconds (ms)". Note that when a TV conference is performed between two terminals 10, the delay time, etc., may be managed at the request source terminal instead of at the destination terminal. On the other hand, when a TV conference is held among three or more terminals 10, the delay time is managed based on data that is sent from the terminal 10 that has received the image data, etc.

In the non-volatile storage unit 5000, a priority level management DB 5006 is constructed by an address priority level management table as follows (table 7) and a transmission speed priority level management table (table 8) as follows.

TABLE 7

| SAME/DIFFERENT PARTS OF DOT ADDRESS | ADDRESS PRIORITY LEVEL |
|---|---|
| SAME.SAME.SAME.DIFFERENT | 5 |
| SAME.SAME.DIFFERENT.- | 3 |
| SAME.DIFFERENT.-.- | 1 |
| DIFFERENT.-.-.- | 0 |

The above address priority level management table indicates whether the dot addresses in an IP address of any one of the terminals 10 and the dot addresses in an IP address of any one of the relay devices 30 are the same or different. Furthermore, in the above address priority level management table, address priority levels are managed in association with the indications of whether the dot addresses are the same or different. In the above address priority level management table, the more the "same" dot addresses among the four dot addresses in the IP address, the higher the address priority level. Specifically, "same" expresses that the dot address is the same, while "different" expresses that the dot address is different, in the address priority level management table. For example, when the top three dot addresses are indicated as being the same, the address priority level is "5". Furthermore, when the top two dot addresses are indicated as being the same, the address priority level is "3". Furthermore, when the topmost dot address is the same, the address priority level is "1". Furthermore, when the topmost dot address is different, the address priority level is "0". Note that in the address priority level management table, the parts that are unrelated to the management are indicated by "-".

TABLE 8

| MAXIMUM DATA TRANSMISSION SPEED IN RELAY DEVICE (Mbps) | TRANSMISSION SPEED PRIORITY LEVEL |
|---|---|
| 1000~ | 5 |
| 100~1000 | 3 |
| 10~100 | 1 |
| ~10 | 0 |

In the above transmission speed priority level management table, the maximum data transmission speed at the relay device 30 and the transmission speed priority level are managed in association with each other. In the above transmission speed priority level management table, the higher the maximum data transmission speed at the relay device 30, the higher the transmission speed priority level. For example, when the maximum data transmission speed at the relay device 30 is "higher than or equal to 1000 Mbps", the transmission speed priority level is "5". Furthermore, when the maximum data transmission speed at the relay device 30 is "100 Mbps through 1000 Mbps", the transmission speed priority level is "3". Furthermore, when the maximum data transmission speed at the relay device 30 is "10 Mbps through 100 Mbps", the transmission speed priority level is "1". Furthermore, when the maximum data transmission speed at the relay device 30 is "less than 10 Mbps", the transmission speed priority level is "0".

In the non-volatile storage unit 5000, a quality management DB 5007 is constructed by a quality management table as follows (table 9).

TABLE 9

| DELAY TIME (ms) | IMAGE QUALITY OF IMAGE DATA TO BE RELAYED (QUALITY OF IMAGE) |
|---|---|
| 0~100 | HIGH IMAGE QUALITY |
| 100~300 | MEDIUM IMAGE QUALITY |
| 300~500 | LOW IMAGE QUALITY |
| 500~ | (INTERRUPTED) |

In the above quality management table, the delay time the delay time and the quality of the image data to be relayed are managed in association with each other. In the above quality management table, the longer the delay time, the lower the quality of the image. That is, as the delay time increases, the relay device 30 decreases the image quality of the image.

In the non-volatile storage unit 5000, a conference management DB 5008 is constructed by a conference management table as follows (table 10).

TABLE 10

| CONFERENCE ID | CONFERENCE PARTICIPATING TERMINAL ID | codec Video/Audio |
|---|---|---|
| conf01 | 01aa, 01da | H264/Speex |
| conf02 | 01bb, 01cb | H264, H265/Speex, Opus |
| ... | ... | ... |

In the above conference management table, the conference ID assigned to each TV conference, the terminal IDs of terminals 10 participating in each conference, and the codec that can be used by all of the terminals 10 participating in the conference are managed in association with each other. The conference management table is updated before the conference starts or when a participant enters or exits the conference.

Example of User Interface (UI)

Figure 7:
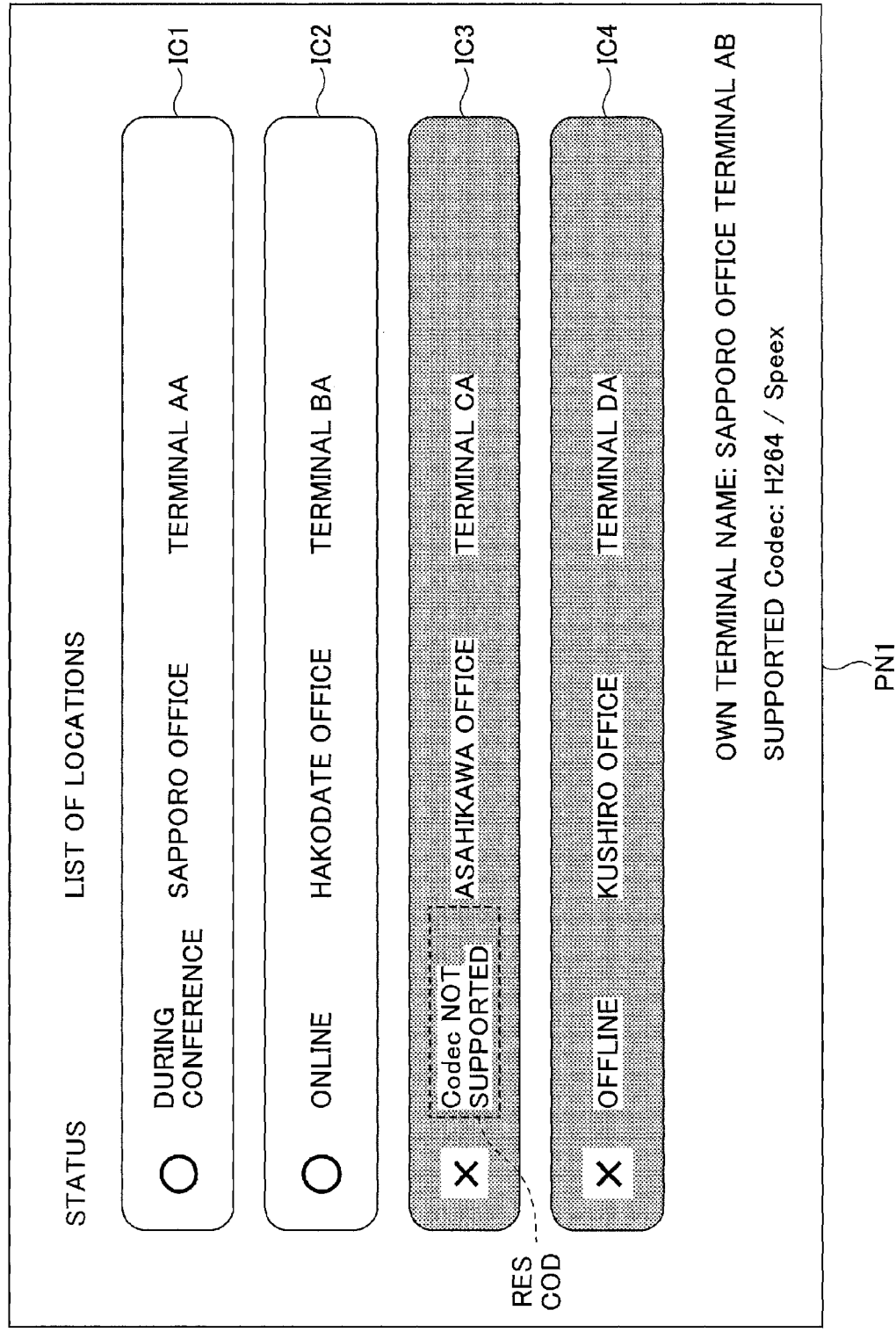
FIG. 7 is a diagram illustrating an example of a UI displayed by the information processing system according to an embodiment of the present invention.

FIG. 7 is a diagram illustrating an example of a UI displayed by the information processing system 1 according to an embodiment of the present invention. A first screen PN1 is displayed for selecting a conference, for example, before the TV conference is held. In this example, the first screen PN1 displays an icon indicating whether a request source terminal (hereinafter, a terminal that is a request source terminal or a terminal that has been a request source terminal may be referred to as an "own terminal") is able to participate in a conference. For example, as illustrated in FIG. 7, in the first screen PN1, a "circle" or a "cross" indicates whether a request source terminal is able to participate in a conference. Furthermore, the first screen PN1 indicates a status by characters or a background color, etc.

The first screen PN1 displays the other party of the conference registered in advance, in "list of locations".

It is determined whether the request source terminal is able to participate in a conference, based on whether there is a codec that can be used by both the request source terminal and the destination terminal used for holding the conference. When it is determined that there is a codec that can be used by both the request source terminal and the destination terminal, the information processing system 1 determines that communication can be performed. When this determination result is obtained, in the first screen PN1, a "circle" is displayed, as in a first icon IC1 and a second icon IC2.

On the other hand, when it is determined there is no codec that can be used by both the request source terminal and the destination terminal, in the first screen PN1, a "cross" is displayed, as in a third icon IC3 and a fourth icon IC4. As illustrated, the determination result may be indicated by characters, such as "codec not supported". Similarly, indications as to whether the terminals 10 can participate in a conference based on the determination result, may be indicated by background colors, such that the first icon IC1, the second icon IC2, the third icon IC3, and the fourth icon IC4 have different background colors. Furthermore, as indicated in the fourth icon IC4, an indication that the request source terminal cannot participate in a conference because the terminal 10 that is the other party of the conference is "offline", may be displayed.

In the following description, a determination as to whether there is a codec that can be used by both a first information processing terminal and a second information processing terminal, may be referred to as a "first determination". Furthermore, the determination result of the first determination may be referred to as a "first determination result". Note that the first determination result is, for example, first determination result display RESCOD, etc. The first determination result display RESCOD indicated in FIG. 7 is a display example indicating a determination result in a case where it is determined that there is no codec that can be used by both a first information processing terminal and a second information processing terminal, by the first determination.

Note that the UI is not limited to the first screen PN1. That is, a UI described below may be used.

Figure 8:
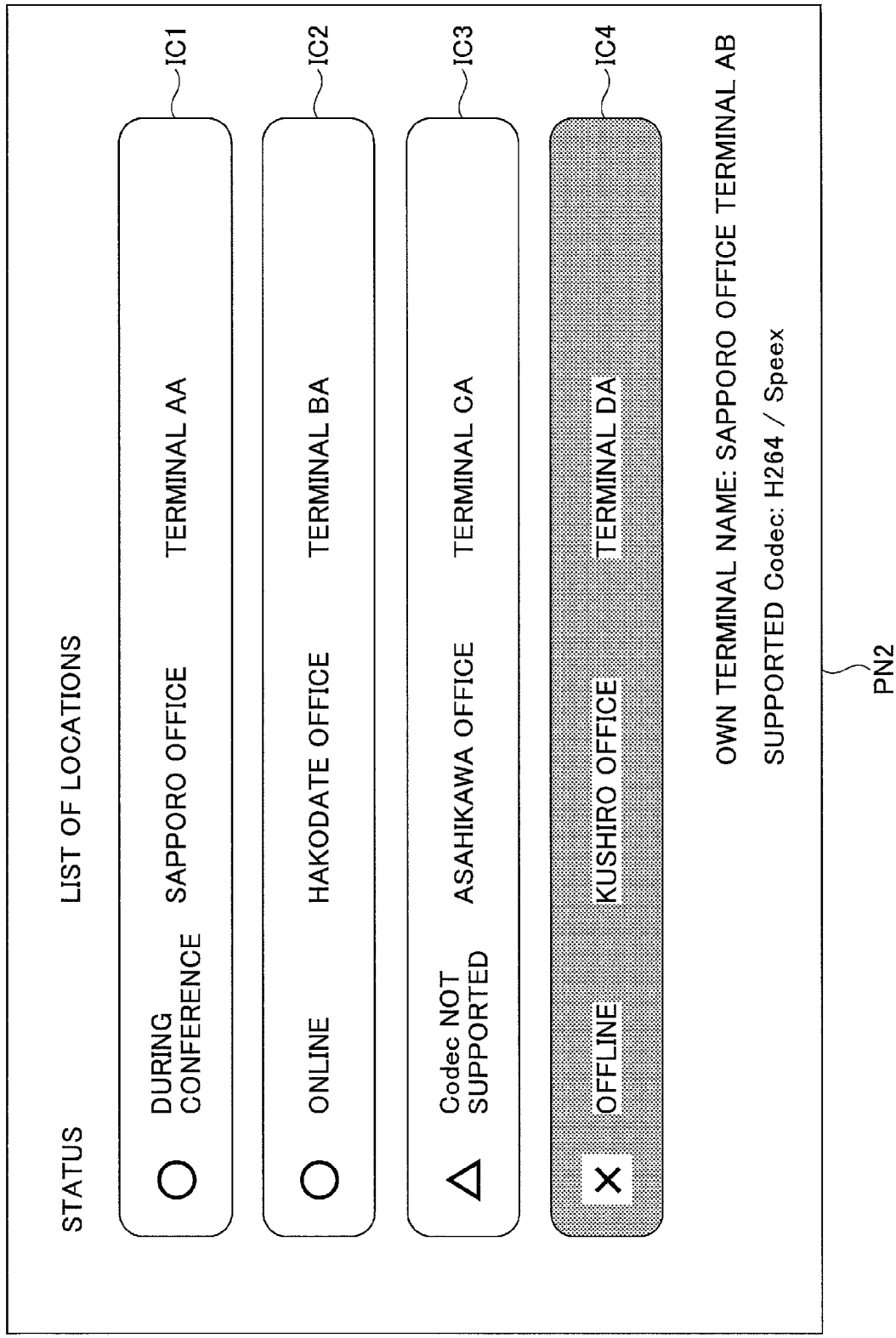
FIG. 8 is a diagram illustrating a second example of a UI displayed by the information processing system according to an embodiment of the present invention.

FIG. 8 is a diagram illustrating a second example of a UI displayed by the information processing system 1 according to an embodiment of the present invention. In a second screen PN2, the background color, etc., of the third icon IC3 is different from that of the first screen PN1 illustrated in FIG. 7.

In the second screen PN2, the display of the background color, etc., differs depending on whether the terminal 10 can be connected via a network. For example, the first icon IC1, the second icon IC2, and the third icon IC3 indicate that the terminal 10 that is the candidate destination terminal is online, by a background color and/or characters. On the other hand, the fourth icon IC4 indicates that the terminal 10 that is the candidate destination terminal is offline, by a background color and characters.

Furthermore, the third icon IC3 may be selected by being operated. That is, the third icon IC3 is a UI that is a button that can be pressed.

Figure 9:
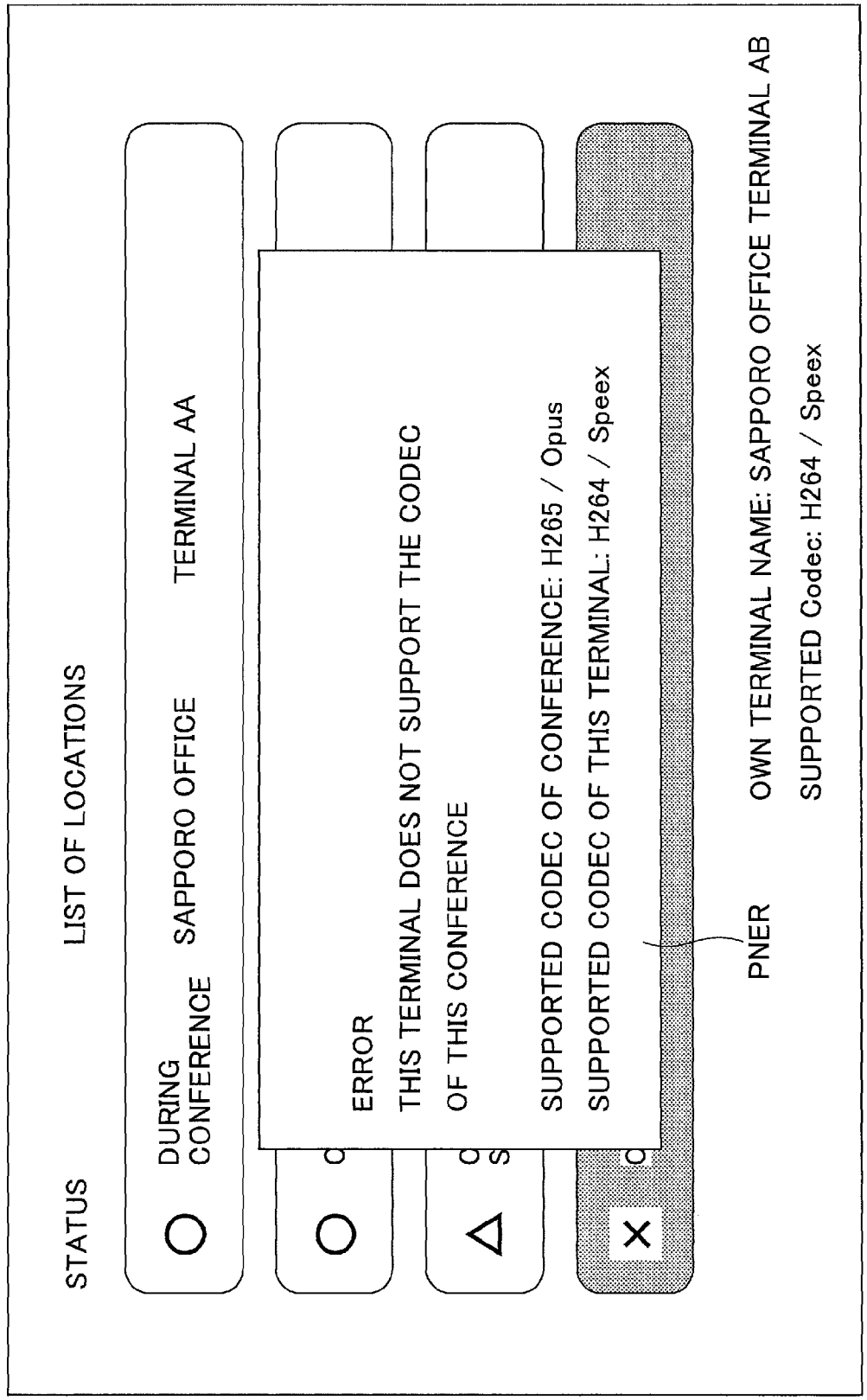
FIG. 9 is a diagram illustrating an example of an error screen that is displayed by the information processing system according to an embodiment of the present invention.

FIG. 9 is a diagram illustrating an example of an error screen that is displayed by the information processing system 1 according to an embodiment of the present invention. For example, in the second screen PN2 illustrated in FIG. 8, when the third icon IC3 is pressed, an error screen PNER may be displayed as illustrated in FIG. 9. As illustrated in FIG. 9, the second screen PN2 displays information such as the codec needed for participating in the conference. By this displayed information, the user is able to know the reason why the terminal is unable to participate in the conference.

Figure 10:
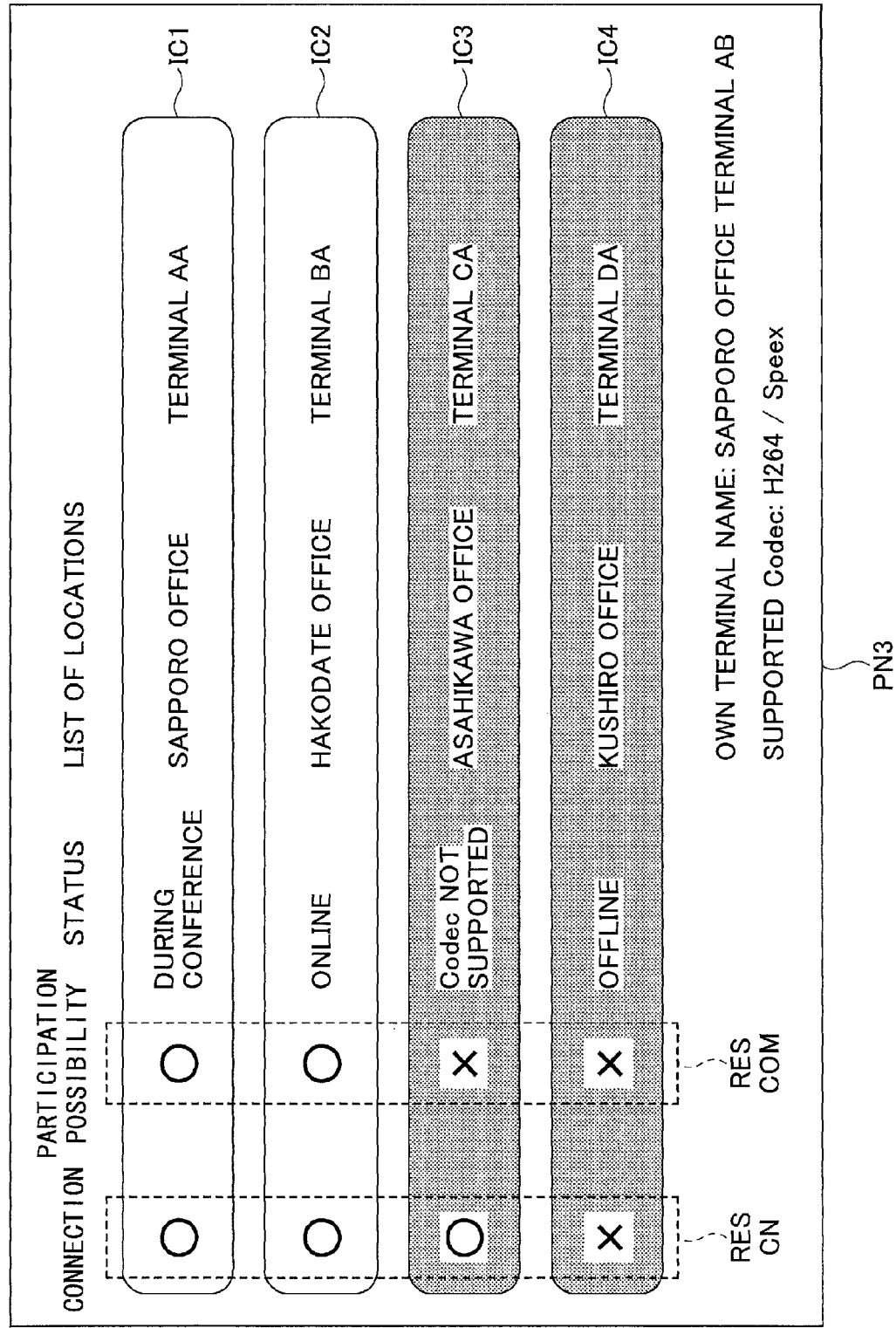
FIG. 10 is a diagram illustrating a third example of a UI displayed by the information processing system according to an embodiment of the present invention.

FIG. 10 is a diagram illustrating a third example of a UI displayed by the information processing system 1 according to an embodiment of the present invention. In a third screen PN3, the display of the determination result is different from that of the first screen PN1 illustrated in FIG. 7.

Specifically, in the third screen PN3, a determination result of whether the request source terminal is able to connect with the terminal 10 that is the candidate destination terminal (hereinafter, "connection determination result RESCN") is displayed. Furthermore, in the third screen PN3, a determination result of whether the request source terminal is able to perform communication with the terminal 10 that is the candidate destination terminal (hereinafter, "participation determination result RESCOM") is displayed.

Furthermore, the UI may be UI in which further information relevant to the codec is displayed.

Figure 11:
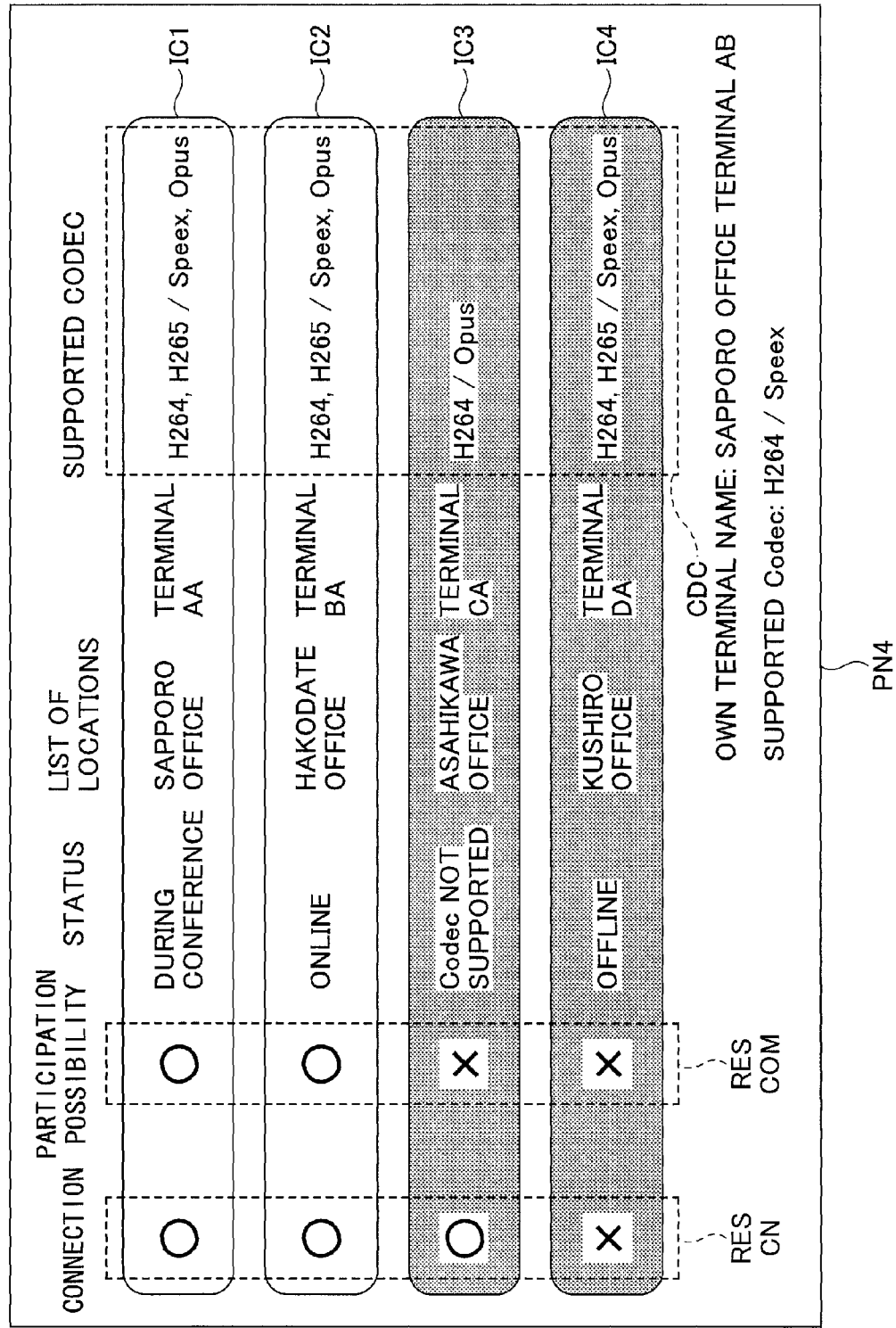
FIG. 11 is a diagram illustrating a fourth example of a UI displayed by the information processing system according to an embodiment of the present invention.

FIG. 11 is a diagram illustrating a fourth example of a UI displayed by the information processing system 1 according to an embodiment of the present invention. As illustrated in FIG. 11, in a fourth screen PN4, "supported codec" is displayed. That is, the fourth screen PN4 is an example in which the name of the specific coded needed for participating in the conference, is displayed. By the fourth screen PN4, for example, in the case of "codec not supported", the information processing system 1 is able to report what kind of codec is to be prepared, to the user.

Example of Overall Process

Figure 12:
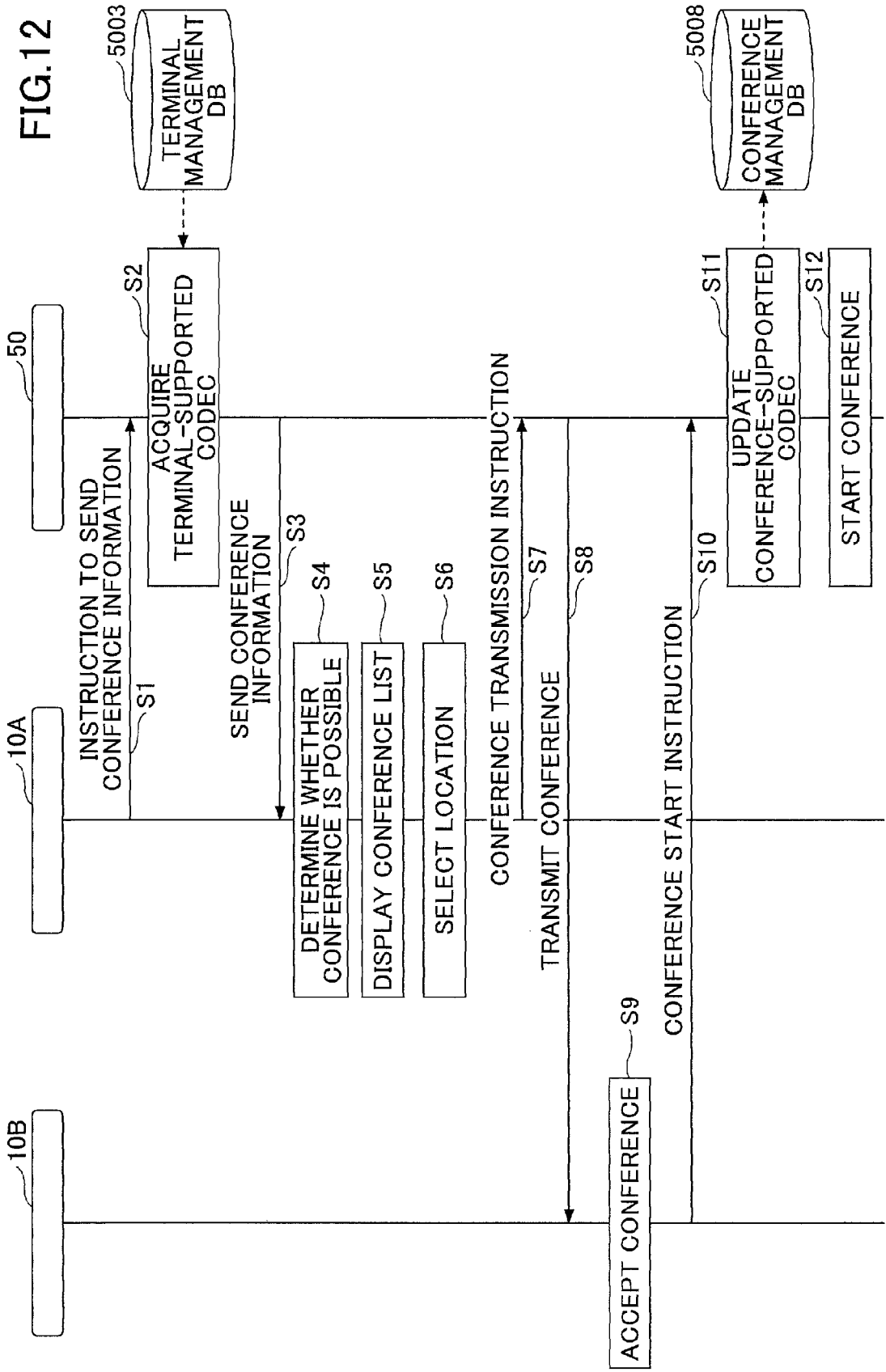
FIG. 12 is a sequence diagram illustrating an example of an overall process by the information processing system according to an embodiment of the present invention.

FIG. 12 is a sequence diagram illustrating an example of an overall process by the information processing system 1 according to an embodiment of the present invention (part 1). The illustrated overall process is a process from when a list of conferences, etc., is displayed in the screen of FIG. 7 to when the conference starts, when a conference is held between a first terminal 10A that is an example of the first information processing terminal and a second terminal 10B that is an example of the second information processing terminal. Note that it is assumed that both the first terminal 10A and the second terminal 10B are in an online state.

In step S1, the first terminal 10A sends an instruction to send conference information, etc., indicating a state, etc., of the conference that is registered, to the management system 50.

In step S2, the management system 50 acquires data indicating the codec from the terminal management DB 5003, etc., by the extracting unit 54 (FIG. 6), etc.

In step S3, the management system 50 sends the conference information, etc.

In step S4, the first terminal 10A determines whether it is possible to hold a conference another terminal 10, based on the conference information, etc.

In step S5, the first terminal 10A displays the conference information, etc., based on the determination result, etc., of step S4.

In step S6, the first terminal 10A inputs an operation of selecting a location by the user.

In step S7, the first terminal 10A sends a conference transmission instruction.

In step S8, the management system 50 transmits a conference based on the conference transmission instruction.

In step S9, the second terminal 10B accepts the conference.

In step S10, when the conference is accepted, the second terminal 10B sends a conference start instruction.

In step S11, the management system 50 updates the conference-supported codec, based on the codec that can be used by both the first terminal 10A and the second terminal 10B, by the state managing unit 53, etc. (FIG. 6).

In step S12, the management system 50 starts the conference.

Figure 13:
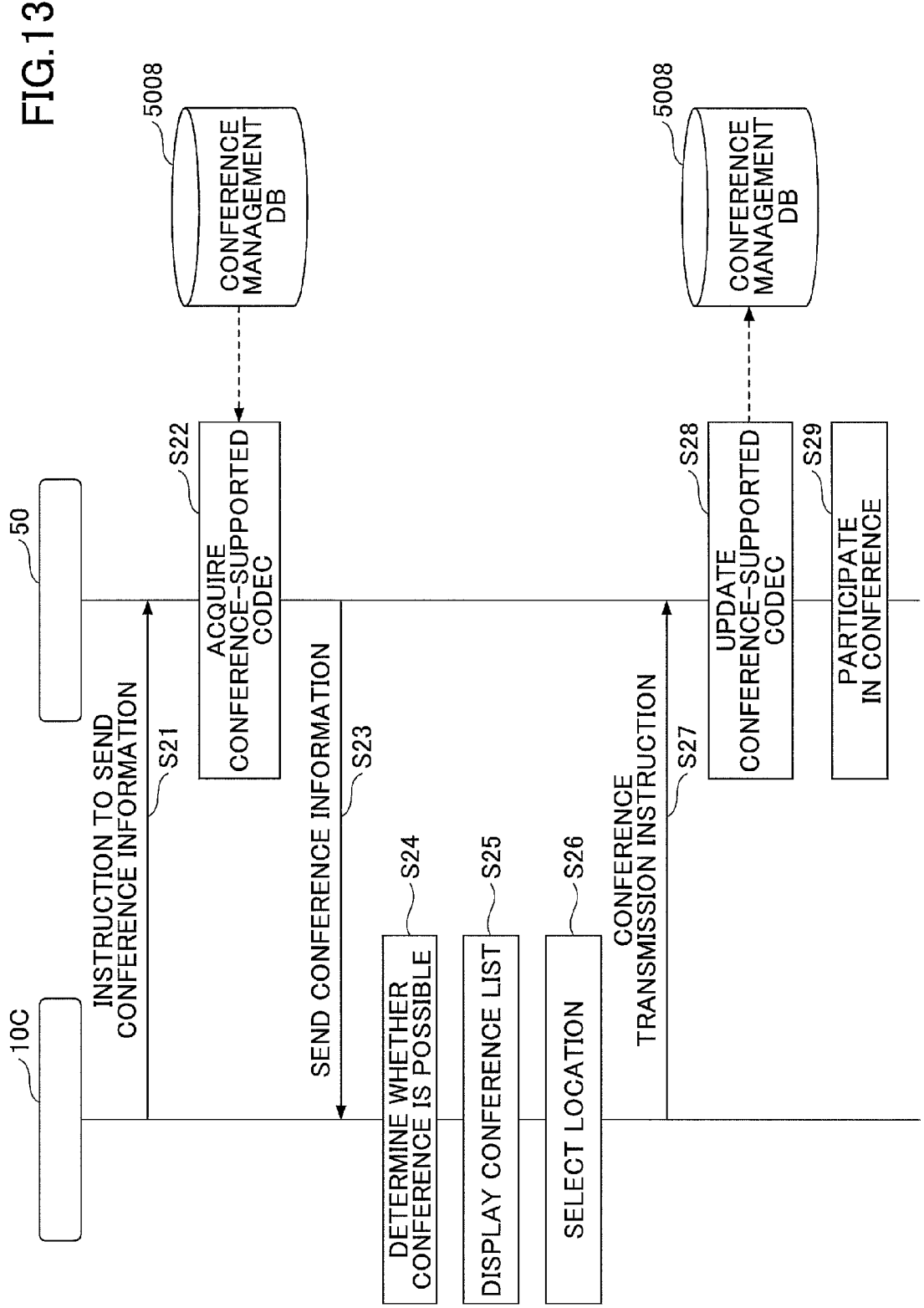
FIG. 13 is a sequence diagram illustrating an example of an overall process by the information processing system according to an embodiment of the present invention (part 2)

FIG. 13 is a sequence diagram illustrating an example of an overall process by the information processing system 1 according to an embodiment of the present invention (part 2). The illustrated overall process is an example of a process that is performed when, for example, another additional information processing terminal (hereinafter, "third terminal 10C") is to participate in the conference, while the conference is established between the first terminal 10A and the second terminal 10B by the overall process, etc., of FIG. 12.

In step S21, the third terminal 10C sends an instruction to send conference information, etc., indicating a state, etc., of the conference that is registered, to the management system 50.

In step S22, the management system 50 acquires data indicating codec from the terminal management DB 5003, etc., by the extracting unit 54 (FIG. 6), etc.

In step S23, the management system 50 sends the conference information, etc.

In step S24, the third terminal 10C determines whether it is possible to hold a conference another terminal, based on the conference information, etc.

In step S25, the third terminal 10C displays the conference information, etc., based on the determination result, etc., of step S24.

In step S26, the third terminal 10C inputs an operation of selecting a location by the user.

In step S27, the third terminal 10C sends a conference participation instruction.

In step S28, the management system 50 updates the conference-supported codec, based on the codec that can be used by all of the information processing terminals 10 to participate in the conference, by the state managing unit 53, etc. (FIG. 6).

In step S29, the management system 50 causes the third terminal 10C to participate in the conference.

Figure 14:
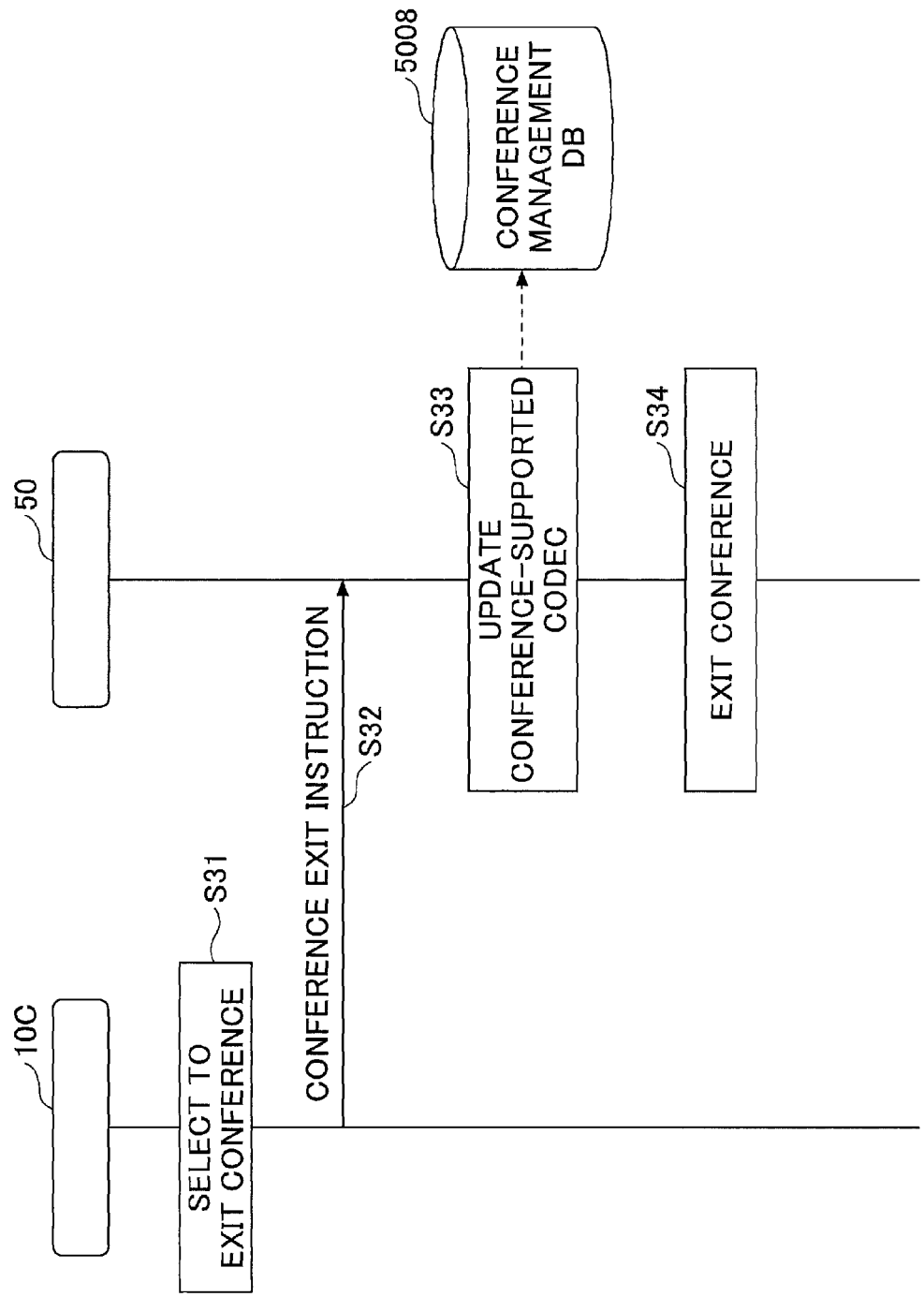
FIG. 14 is a sequence diagram illustrating an example of an overall process by the information processing system according to an embodiment of the present invention (part 3)

FIG. 14 is a sequence diagram illustrating an example of an overall process by the information processing system 1 according to an embodiment of the present invention (part 3). The illustrated overall process is an example of a process that is performed when, for example, the third terminal 10C exits the conference, while the conference is established between the first terminal 10A, the second terminal 10B, and the third terminal 10C by the overall process, etc., of FIG. 13

In step S31, the third terminal 10C inputs an operation of selecting to exit the conference by the user.

In step S32, the third terminal 10C sends a conference exit instruction, etc., to the management system 50.

In step S33, the management system 50 updates the conference-supported codec, based on the codec that can be used by both the first terminal 10A and the second terminal 10B, by the state managing unit 53, etc. (FIG. 6).

In step S34, the management system 50 causes the third terminal 10C to exit the conference.

Figure 15:
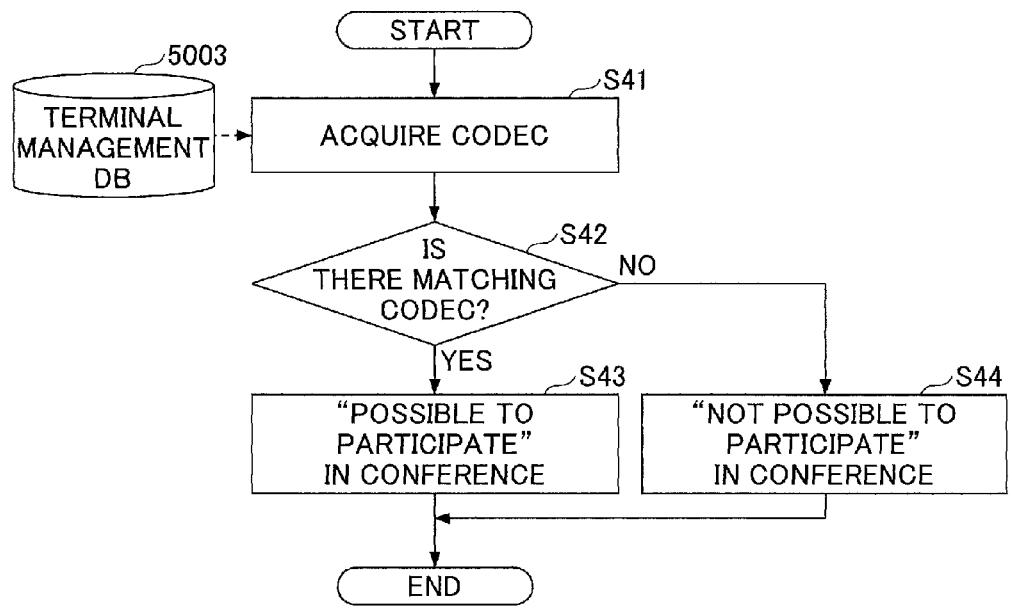
FIG. 15 is a flowchart of an example of a determination process relevant to the codec by the information processing system according to an embodiment of the present invention.

FIG. 15 is a flowchart of an example of a determination process relevant to the codec by the information processing system 1 according to an embodiment of the present invention. The illustrated process is an example of the process performed in step S4 of FIG. 12, etc. Note that this is an example of a case where a TV conference is performed in a so-called "one-on-one" manner, in which the conference is held between two information processing terminals 10, as illustrated in FIG. 12, etc.

In step S41, the first information processing terminal acquires the type, etc., of the codec that can be used by the terminals 10. For example, the first information processing terminal acquires the type, etc., of the codec, from the data, etc., indicating the codec that can be used by the information processing terminals 10 for performing communication (hereinafter, "codec data") that can be acquired from the terminal management DB 5003 in step S2 of FIG. 12. Note that the codec data indicates the information indicates information, etc., that is input to "codec video/audio" in the above table 4.

In step S42, the first information processing terminal determines whether there is a matching codec. That is, in step S42, which is an example of a first determination, it is determined whether there is a codec that can be used by both the request source terminal and the destination terminal.

When it is determined that there is a matching codec (YES in step S42), the first information processing terminal proceeds to step S43. On the other hand, when it is determined that there is no matching codec (NO in step S42), the first information processing terminal proceeds to step S44.

In step S43, the first information processing terminal determines that it is "possible to participate" in the conference.

In step S44, the first information processing terminal determines that it is "not possible to participate" in the conference.

Figure 16:
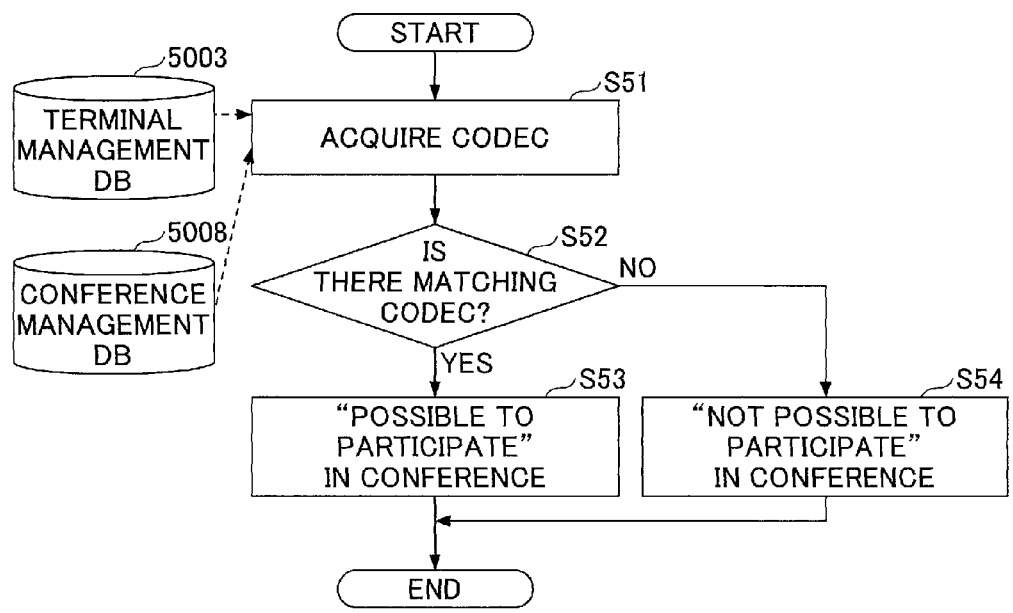
FIG. 16 is a flowchart of another example of a determination process relevant to the codec by the information processing system according to an embodiment of the present invention.

FIG. 16 is a flowchart of another example of a determination process relevant to the codec by the information processing system 1 according to an embodiment of the present invention. The illustrated process is an example of the process performed in step S24 of FIG. 13, etc. Note that this is an example of a case where a TV conference is performed at so-called "multiple locations", in which the conference is held among three or more information processing terminals 10, as illustrated in FIG. 13, etc.

In step S51, the information processing terminal 10 acquires the type, etc., of the codec that can be used by the terminals 10. For example, the information processing terminal 10 acquires the type, etc., of the codec, from the codec data, etc., that can be acquired from the terminal management DB 5003 and the conference management DB 5008, in step S22 of FIG. 13. Note that the codec data indicates the information, etc., that is input to "codec video/audio" in the above table 4, and information, etc., that is input to "codec video/audio" in the above table 10.

In step S52, the information processing terminal 10 determines whether there is a matching codec. That is, in step S52, which is an example of a first determination, it is determined whether there is a codec that can be used by the request source terminal and all of the information processing terminals 10 with which the conference is being held.

When it is determined that there is a matching codec (YES in step S52), the information processing terminal 10 proceeds to step S53. On the other hand, when it is determined that there is no matching codec (NO in step S52), the information processing terminal 10 proceeds to step S54.

In step S53, the information processing terminal 10 determines that it is "possible to participate" in the conference.

In step S54, the information processing terminal 10 determines that it is "not possible to participate" in the conference.

When it is determined as "possible to participate" in step S43 of FIG. 15 and in step S53 of FIG. 16, etc., for example, the information processing terminal 10 displays a "circle" in the "participation possibility" in the fourth screen PN4 illustrated in FIG. 11. On the other hand, when it is determined as "not possible to participate" in step S44 of FIG. 15 and in step S54 of FIG. 16, etc., for example, the information processing terminal 10 displays a "cross" in the "participation possibility" in the fourth screen PN4 illustrated in FIG. 11.

First, when a conference is held between two information processing terminals 10, in the information processing system 1, it is determined whether a request source terminal that is an example of the first information processing terminal and a destination terminal that is an example of a second information processing terminal can be connected via a network. Hereinafter, this determination is referred to as a "second determination". Specifically, for example, the second determination is made by determining whether the destination terminal is online. When the destination terminal is determined to be online, the power of the destination terminal is "ON", that is, the power is being supplied to the destination terminal. Furthermore, in order to determine that the destination terminal is online, considerations may be made with respect to whether a cable for connecting to a network is physically connected to the destination terminal and whether various settings of the network have been completed, etc. Note that when determining whether the destination terminal is online in a case where the destination terminal connects to the network in a wireless manner, considerations may be made with respect to whether an antenna, etc., used for wireless communication is in a state of being capable of transmitting and receiving radio waves.

On the other hand, in the information processing system 1, the first determination is made of determining whether there is a codec that can be used by both the request source terminal and the destination terminal. Specifically, when the codec, which can be used by the request source terminal, cannot be used by the destination terminal, there are many cases where communication cannot be performed in the information processing system 1. Therefore, the information processing system 1 determines whether there is a matching codec between the codecs that can be used by the request source terminal and the codecs that can be used by the destination terminal. When this determination result is displayed as in FIG. 7, etc., the information processing system 1 is able to indicate whether there is a codec that can be used, etc., at each of the information processing terminals 10 performing communication. Accordingly, the user is able to know whether communication is possible, without connecting each of the information processing terminals 10 in the communication, that is, without performing so-called test connections, etc.

Furthermore, in addition to determination result of whether there is a codec that can be used, the determination result, etc., of the second determination may be displayed. For example, the connection determination result RESCN, which is an example of the displayed second determination result as in FIG. 11, may be displayed. As described above, when the second determination result is displayed, the use is able to know whether each of the information processing terminals 10 can be connected to the network.

Furthermore, as illustrated in FIG. 11, the participation determination result RESCOM may be displayed as illustrated in FIG. 11, based on the first determination result and the second determination result. That is, when it is determined that there is a matching codec between the codecs that can be used by the request source terminal and the codecs that can be used by the destination terminal in the first determination, and when it is determined that the information processing terminals 10 can be connected to the network in the second determination, a "circle" is displayed as the participation determination result RESCOM. On the other hand, when it is determined that there is no matching codec in the first determination or when it is determined that connection to the network is not possible in the second determination, a "cross" is displayed as the participation determination result RESCOM.

In a TV conference, etc., there are cases where communication is performed between remote locations. In this case, it is difficult to confirm the state of the destination terminal by the naked eye. Therefore, for example, when the information processing terminals 10 are connected in order to hold a TV conference, but a TV conference cannot be held, it may be preferable to check what the reason is. In this case, when the second determination result and "participation possibility" are separately displayed as illustrated in FIG. 11, the user is able to identify that the reason why a TV conference cannot be held is that the power of the destination terminal is not ON. Furthermore, when a "supported codec", etc., is displayed as illustrated in FIG. 11, and a TV conference cannot be held because an appropriate codec is unavailable, the user is able to identify the codec to be prepared in order to participate in the conference.

Therefore, by displaying the above information, when a TV conference cannot be held, the information processing system 1 is able to reduce the trouble taken by the user for identifying the reason. Furthermore, by displaying the above information, the information processing system 1 is able to reduce the need for test connections, etc., and therefore the information processing system 1 is able to reduce the trouble taken by the user for performing test connections, etc.

Various processes of the embodiments according to the present invention are not limited to being executed by the devices described above. That is, in the embodiments according to the present invention, the processes may be executed by devices other than the devices described above. For example, in the example of FIG. 12, the determination of step S4 may be performed by the management system 50, and subsequently, the determination result of step S4 may be sent to the information processing terminal 10.

Furthermore, various processes described above may be performed in a redundant mode, in a distributed mode, or in a parallel mode, or by a combination of these modes.

Note that the embodiments according to the present embodiment may be realized by a program that causes a computer of an information processing terminal, an information processing apparatus, or an information processing system including one or more information processing apparatuses, to execute an information processing method.

According to one embodiment of the present invention, an information processing system is capable of indicating whether there is a codec that can be used by an information processing terminal.

The information processing system, the information processing apparatus, and the information processing method are not limited to the specific embodiments described in the detailed description, and variations and modifications may be made without departing from the spirit and scope of the present invention.

What is claimed is:

1. An information processing system that performs communications for transferring data between multiple information processing apparatuses, the information processing system comprising:
    an establishing unit configured to establish a session for transferring management information of each information processing apparatus, between the multiple information processing apparatuses;
    a determining unit configured to determine whether a codec can be used by each information processing apparatus among the multiple information processing apparatuses, and determine whether each information processing apparatus among the multiple information processing apparatuses is capable of participating in a conference, based on the management information; and
    a display unit configured to display, based on the determination by the determining unit of whether each information processing apparatus among the multiple information processing apparatuses is capable of participating in the conference, a possibility of communication between the multiple information processing apparatuses.

2. The information processing system according to claim 1, wherein the management information includes, for each information processing apparatus among the multiple information apparatuses, information relating to a codec that the information processing apparatus is capable of using.

3. The information processing system according to claim 1,
    wherein the display unit is configured to display respective icons corresponding to each information processing apparatus among the multiple information processing apparatuses; and
    wherein a background color of each respective icon varies, according to whether the information processing apparatus corresponding to each respective icon is determined by the determining unit as capable of participating in the conference, in the determination of whether each information processing apparatus among the multiple information processing apparatuses is capable of participating in the conference.

4. The information processing system according to claim 2,
    wherein the display unit is configured to display respective icons corresponding to each information processing apparatus among the multiple information processing apparatuses; and
    wherein a background color of each respective icon varies, according to whether the information processing apparatus corresponding to each respective icon is determined by the determining unit as capable of participating in the conference, in the determination of whether each information processing apparatus among the multiple information processing apparatuses is capable of participating in the conference.

5. The information processing system according to claim 1, wherein the display unit displays information relating to a codec that is necessary for communication with an information processing apparatus among the multiple information apparatuses.

6. The information processing system according to claim 2, wherein the display unit displays information relating to a codec that is necessary for communication with an information processing apparatus among the multiple information apparatuses.

7. An information processing method for performing communications for transferring data between multiple information processing apparatuses, the information processing method comprising:
    establishing a session for transferring management information of each information processing apparatus, between the multiple information processing apparatuses;

determining whether a codec can be used by each information processing apparatus among the multiple information processing apparatuses, based on the management information;

determining whether each information processing apparatus among the multiple information processing apparatuses is capable of participating in a conference, based on the management information; and displaying, based on the determination of whether each information processing apparatus among the multiple information processing apparatuses is capable of participating in the conference, a possibility of communication between the multiple information processing apparatuses.

* * * * *